(12) United States Patent
Garcia-Barrio

(10) Patent No.: US 8,745,058 B1
(45) Date of Patent: Jun. 3, 2014

(54) DYNAMIC DATA ITEM SEARCHING

(75) Inventor: Laura Garcia-Barrio, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 19 days.

(21) Appl. No.: 13/400,814

(22) Filed: Feb. 21, 2012

(51) Int. Cl.
*G06F 17/30* (2006.01)

(52) U.S. Cl.
USPC .......................................... 707/737

(58) Field of Classification Search
USPC .......................... 707/737, 999.101
See application file for complete search history.

(56) References Cited

U.S. PATENT DOCUMENTS

| | | | |
|---|---|---|---|
| 6,124,843 A | 9/2000 | Kodama | |
| 6,396,497 B1 | 5/2002 | Reichlen | |
| 6,434,556 B1 | 8/2002 | Levin et al. | |
| 7,447,999 B1 * | 11/2008 | Robertson et al. | 715/835 |
| 7,555,478 B2 | 6/2009 | Bayley et al. | |
| 7,627,582 B1 | 12/2009 | Erchov | |
| 8,266,542 B2 * | 9/2012 | Sayers et al. | 715/781 |
| 8,326,835 B1 * | 12/2012 | Munter | 707/737 |
| 2002/0158827 A1 | 10/2002 | Zimmerman | |
| 2005/0175218 A1 * | 8/2005 | Vertegaal et al. | 382/103 |
| 2007/0219964 A1 * | 9/2007 | Cannon et al. | 707/999.003 |
| 2009/0018995 A1 * | 1/2009 | Chidlovskii et al. | 707/999.002 |
| 2009/0070346 A1 * | 3/2009 | Savona et al. | 707/999.1 |
| 2010/0060599 A1 * | 3/2010 | Kwak et al. | 345/173 |
| 2011/0055203 A1 | 3/2011 | Gutt et al. | |

OTHER PUBLICATIONS

Microsoft, "Tips for Finding Files" Feb. 17, 2011. Retrieved on Sep. 10, 2013 from http://web.archive.org/web/20110217144717/http://windows.microsoft.com/en-US/windows-vista/Tips-for-finding-files.*

Schultz, "Weed through your files part two" Tech Republic, Mar. 17, 2011. Retrived on Sep. 10, 2013 from http://www.techrepublic.com/blog/windows-and-office/weed-through-your-files-part-two-windows-7-group-by-and-filter-features.*

* cited by examiner

*Primary Examiner* — Cam-Linh Nguyen
(74) *Attorney, Agent, or Firm* — McDonnell Boehnen Hulbert & Berghoff LLP

(57) ABSTRACT

Methods and systems for searching and navigating through data items in a database are provided. In one example, each data item in the database is associated with attributes and attribute values. The data items in the database may be grouped according to a first selection of attributes and attribute values, forming a first data item cluster of data items associated with the first selection of attributes and attribute values. From among the attributes and attribute values associated with data items in the first data item cluster, a second selection of attributes and attribute values may be made. A second data item cluster may be formed including data items associated with the second selection of attributes and attribute values. After a desired data item is found, a computing action associated with the desired data item may then be executed.

20 Claims, 17 Drawing Sheets

| | Attribute 1 | Attribute 2 | Attribute 3 | Attribute 4 | Attribute 5 | Attribute 6 | Attribute 7 | Attribute 8 | Attribute 9 |
|---|---|---|---|---|---|---|---|---|---|
| Data Item 1 | | O | | | O | □ | | | O |
| Data Item 2 | O | O | △ | | O | | O | | O |
| Data Item 3 | | O | | O | | | | O | |
| Data Item 4 | | | | | O | | O | | O |
| Data Item 5 | O | O | | O | O | + | | | |
| Data Item 6 | | | ◇ | | | □ | O | O | |
| Data Item 7 | ◆ | | △ | | | □ | | | |
| Data Item 8 | | O | △ | O | | | O | O | |
| Data Item 9 | | O | | O | | ● | | O | O |

| Attribute 6 | Attribute 1 | Attribute 2 | Attribute 3 | Attribute 4 | Attribute 5 | Attribute 6 | Attribute 7 | Attribute 8 | Attribute 9 |
|---|---|---|---|---|---|---|---|---|---|
| Data Item 1 |  | ○ |  |  | ○ | □ |  |  | ○ |
| Data Item 5 | ○ | ○ |  | ○ | ○ | + |  |  |  |
| Data Item 6 |  |  | ◇ |  |  | □ | ○ | ○ |  |
| Data Item 7 | ◈ |  | △ |  |  | □ |  |  |  |
| Data Item 9 |  | ○ |  | ○ |  | ● |  | ○ | ○ |

| Attribute 3 △ | Attribute 1 | Attribute 2 | Attribute 3 | Attribute 4 | Attribute 5 | Attribute 6 | Attribute 7 | Attribute 8 | Attribute 9 |
|---|---|---|---|---|---|---|---|---|---|
| Data Item 2 | ○ | ○ | ▲ |  | ○ |  | ○ |  | ○ |
| Data Item 7 | ◈ |  | ▲ |  |  | ⟦□⟧ |  |  |  |
| Data Item 8 |  | ○ | ▲ |  | ○ |  | ○ | ○ |  |

| Attribute 6 ☐ | Attribute 1 | Attribute 2 | Attribute 3 | Attribute 4 | Attribute 5 | Attribute 6 | Attribute 7 | Attribute 8 | Attribute 9 |
|---|---|---|---|---|---|---|---|---|---|
| Data Item 1 |  | ○ |  |  | ○ | ☐ |  |  | ○ |
| Data Item 6 |  |  | ◇ |  |  | ☐ | ○ | ○ |  |
| Data Item 7 | ◆ |  | △ |  |  | ☐ |  |  |  |

| Attribute 3 AND Attribute 6 ☐ | Attribute 1 | Attribute 2 | Attribute 3 | Attribute 4 | Attribute 5 | Attribute 6 | Attribute 7 | Attribute 8 | Attribute 9 |
|---|---|---|---|---|---|---|---|---|---|
| Data Item 6 |  |  | ◇ |  |  | ☐ | ○ | ○ |  |
| Data Item 7 | ◆ |  | △ |  |  | ☐ |  |  |  |

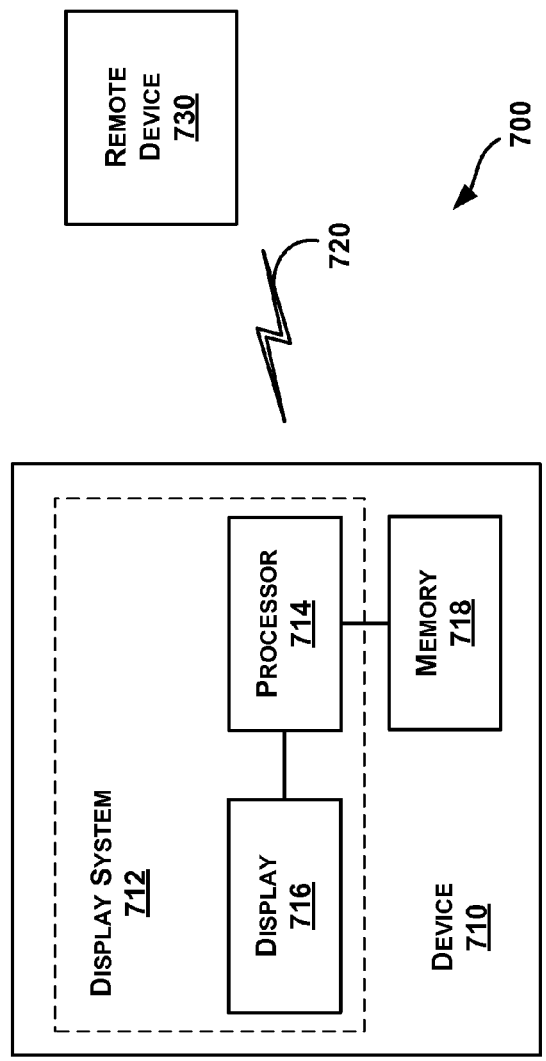

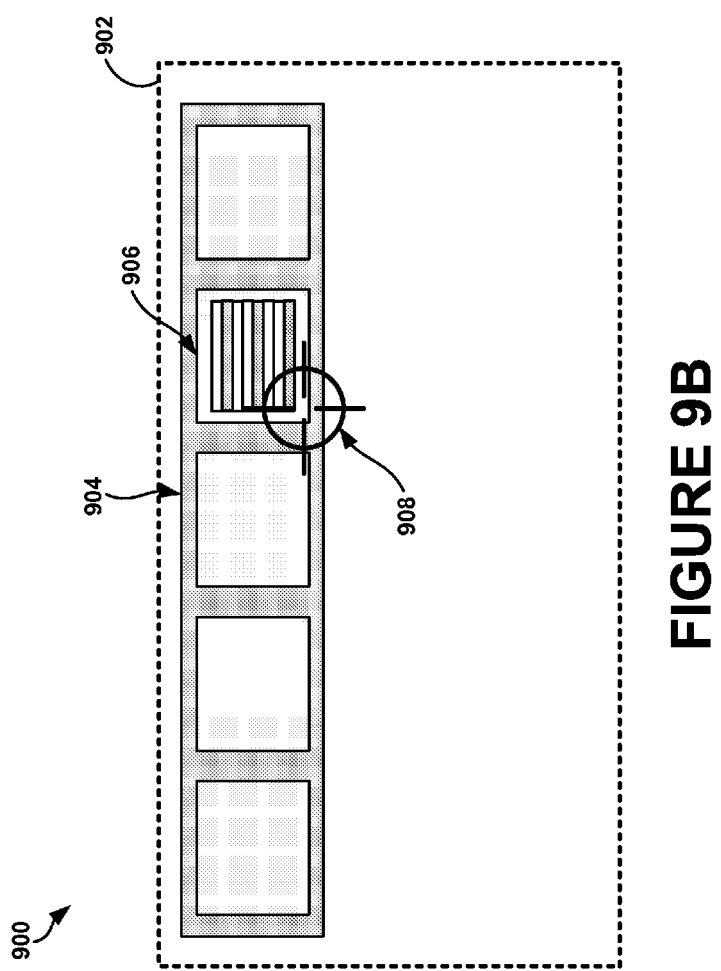

DYNAMIC DATA ITEM SEARCHING

BACKGROUND

Unless otherwise indicated herein, the materials described in this section are not prior art to the claims in this application and are not admitted to be prior art by inclusion in this section.

Various technologies may be utilized to display information to a user of a computing system. Some systems for displaying information may utilize a screen, such as a liquid crystal display (LCD) screen. The screen may be integrated into a portable device such as a mobile phone or audio playback device, that can be moved into a position at which the screen is viewable by a user.

Other systems for displaying information to a user may utilize head-mounted displays (HMDs). A HMD can be incorporated into a pair of goggles, glasses, a headband, a helmet, or other such device that the user can wear. A head-mounted display is typically positioned near the user's eyes and calibrated and/or aligned to the user's field of view to allow the user to view displayed information with little or no head movement.

In some cases, the display may also be transparent or translucent, allowing the user to view and interact with the surrounding real-world environment while wearing the head-mounted display. In other cases, the display may not be transparent, but may project a captured image of the environment on the display to simulate transparency or translucency. In still other cases, the display may be formed directly on a user's retina via a low-powered laser scanning technique. To generate display information such as images and text for display, a computer processing system may be used. Such HMDs have a variety of applications, such as information display/interaction, aviation information systems, vehicle navigation systems, social networking, and video games, among others.

In the case of information display/interaction applications, display information may include information regarding the surrounding environment of the user wearing the HMD. For example, the display may indicate personal information for a person the user is looking at, such as a name and birthday of the person, or interaction information for the person the user is looking at, such as social network activity or interpersonal correspondences. In another example, the display may indicate business information for a shop or restaurant the user is looking at through the display, such as types of merchandise available at the store, price ranges, and customer reviews. In a further example, the display may indicate media information for a song the user is hearing, such as a title of the song. In addition to providing information to the user wearing the HMD, the HMD may also be configured to capture information associated with the user and the user's environment as the user engages in real-world experiences. For example, the HMD may collect visual and audio information associated with the real-world experiences and store the information locally or remotely.

As more information becomes available and storage capacities continue to increase, an abundant amount of collected visual and audio information associated with a user's real-world experience may be stored. As such, efficient and intuitive methods for searching and navigating through the stored information may be desired to allow the user wearing the HMD to access the stored information with relative ease.

SUMMARY

Disclosed herein are systems and methods that may be implemented to provide an efficient and intuitive search for, and navigation of, stored information associated with a user's real-world experience as well as information available on a database accessible via a network, such as the internet, among other examples.

In one example, a system with at least one processor and a non-transitory computer readable medium is provided. Program instructions may be stored on the non-transitory computer readable medium and may be executable by the at least one processor to perform functions. The functions include maintaining a data item-attribute database including data for a set of data items. The data for a given one of the data items may specify one or more attributes from a set of attributes. The functions may also include receiving first input data indicating a first selection of one or more attributes from the set of attributes, and grouping a first subset of data items from the set of data items into at least a first data item cluster. Each data item in the first data item cluster may share at least one of the one or more first selected attributes. The functions may also include causing a display to provide a first visual indication of the first data item cluster, receiving second input data indicating a second selection of one or more attributes associated with one or more data items in the first data item cluster, and grouping a second subset of data items from the set of data items into at least a second data item cluster. Each data item in the second data item cluster may share at least one of the one or more second selected attributes. The functions may further include causing the display to provide a second visual indication of the second data item cluster.

In another embodiment, a method is provided that includes maintaining a data item-attribute database including data for a set of data items. The data for a given one of the data items may specify one or more attributes from a set of attributes. The functions may also include receiving first input data indicating a first selection of one or more attributes from the set of attributes, and grouping a first subset of data items from the set of data items into at least a first data item cluster. Each data item in the first data item cluster may share at least one of the one or more first selected attributes. The functions may also include causing a display to provide a first visual indication of the first data item cluster, receiving second input data indicating a second selection of one or more attributes associated with one or more data items in the first data item cluster, and grouping a second subset of data items from the set of data items into at least a second data item cluster. Each data item in the second data item cluster may share at least one of the one or more second selected attributes. The functions may further include causing the display to provide a second visual indication of the second data item cluster.

In yet another example, a computer readable memory with instructions stored thereon is provided. The instructions may be executable by a computing device to cause the computing device to execute functions. The functions include maintaining a data item-attribute database including data for a set of data items. The data for a given one of the data items may specify one or more attributes from a set of attributes. The functions may also include receiving first input data indicating a first selection of one or more attributes from the set of attributes, and grouping a first subset of data items from the set of data items into at least a first data item cluster. Each data item in the first data item cluster may share at least one of the one or more first selected attributes. The functions may also include causing a display to provide a first visual indication of the first data item cluster, receiving second input data indicating a second selection of one or more attributes associated with one or more data items in the first data item cluster, and grouping a second subset of data items from the set of data items into at least a second data item cluster. Each data item in the second data item cluster may share at least one of the one or more second selected attributes. The functions may further include causing the display to provide a second visual indication of the second data item cluster.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 2 illustrates an example data item-attribute database for storing data items associated with real-world experiences of a user.

FIG. 3A illustrates an example first data item cluster of the data item-attribute database.

FIG. 3B illustrates an example second data item cluster of the data item-attribute database.

FIG. 3C illustrates an example third data item cluster of the data item-attribute database.

FIG. 3D illustrates an example fourth data item cluster of the data item-attribute database.

FIG. 7 shows a simplified block diagram of an example computer network infrastructure.

FIG. 9B shows aspects of an example user-interface after receiving movement data corresponding to an upward movement.

DETAILED DESCRIPTION

Figure 1:
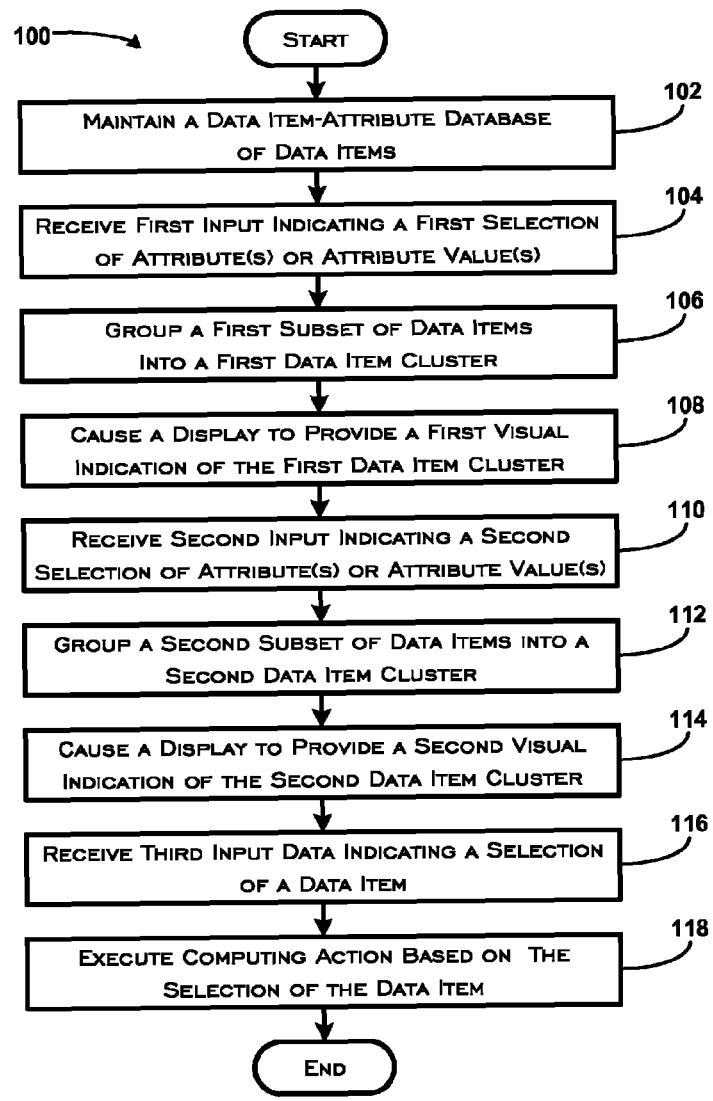
FIG. 1 shows a simplified block diagram of a method for data item searching.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. OVERVIEW

In an example scenario, a user wearing a head-mountable device (HMD) may be engaged in a real-world experience. For example, the user may be listening to music, watching a live concert, conversing with friends, eating pizza, or running through a rain storm while wearing the HMD, among other possibilities. In one case, the HMD may include a camera and a microphone configured to capture visual and audio signals representing the experience from a perspective of the user. Additional information relating to the HMD, and how the HMD may capture signals representing an experience, can be found below in connection with FIGS. 5-9. The various captured signals representing an experience may be referred to herein as "content."

The content experienced by the user may include multiple aspects. For example, watching a live concert may include listening to music, watching the performer, enjoying a beverage, and conversing with friends. In another case, the user may experience similar content in a different situation. For example, the user may be listening to the same song at different locations and during different times. In either case, the HMD may capture the content experienced by the user and may further associate the content, or aspects of the content with other content or aspects of the other content, as applicable. In the particular case of the user listening to a song, for instance, other content or aspects of the other content may include a location, a date, a time, or and people the user is with when the user is listening to the song.

The user may wish to recall content or aspects of the content experienced by the user at a previous time. To recall the previously experienced content, in accordance with the disclosure herein, the user may perform a query, and/or navigate through visual and/or audio data items, among other possible data items, representing previously experienced content that has been captured by the HMD.

In one case, the user may navigate through visual and/or audio data items representing content captured by the HMD based on associations among the captured content or aspects of the content. In such a case, the content may be stored in a data item database, and the user may view clusters of data items grouped according to certain associations of the data items. In one instance, the database may be searched according to one or more associations selected by the user. For example, the user may wish to recall past experiences involving rain storms. As such, the database may be searched such that data items associated with rain storms are provided to the user. In this way, a data item cluster may be formed such that it contains data items associated with rain storms. Further discussions relating to systems and methods for providing content or aspects of the content to a user based on associations among the content or aspects of the content may be found below in more detail.

While examples described herein may refer specifically to the use of an HMD, those skilled in the art will appreciate that any computing device may be configured to execute the methods described herein to achieve relevant results.

2. METHOD FOR DATA ITEM SEARCHING

FIG. 1 is a block diagram of an exemplary method 100 for data item searching, according to one embodiment of the present disclosure. Method 100 may include one or more operations, functions, or actions as illustrated by one or more of blocks 102-118. Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive, as described later in FIGS. 7 and 8. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At block 102, the method 100 involves maintaining a data item-attribute database that includes data for a set of data items. In one case, the data items may be data items available on a database accessible via a network, such as the internet. In another case, the data items may be associated with experiences of a user, and may include a variety of different files, including picture files, video files, audio files, word-processing files, and email files, among other possible files. In one instance, the data for a given one of the data items may specify one or more attributes from a set of attributes associated with the given data item. In this instance, the set of attributes may be associated with experiences of the user, and may include, without limitation, a location attribute, a time attribute, and a data-item-type attribute of the given data item, among other possible attributes. In addition to specifying attributes, the data may further specify one or more attribute values associated with the given data item. In this case, the one or more attribute values may indicate information associated with the one or more attributes associated with the given one of the data items. In one case, attributes or attribute values associated with a file may have values that are null, indicating that the attributes may not be applicable to the file.

FIG. 2 shows a database 200, as an illustrative example of the data item-attribute database discussed above. As shown, the data item-attribute database 200 includes data items 202 labeled as data items 1-9, and attributes 204, labeled as attributes 1-9. As described above, each entry in the example database 200 may either have an attribute value or a null attribute value for each attribute. For the purposes of illustration, attribute values of the database 200 may be represented by different symbols, and null attribute values may be represented by blank spaces. For example, an attribute value for attribute 6 of data item 7 may be "□." In addition, "□" may also be the attribute value for attribute 6 of data items 1 and 6. For example, attribute 6 could be a location attribute and data items 1, 6, and 7 may each be associated with the same location. Similarly, an attribute value "Δ" may be the attribute value for attribute 3 of data items 2, 7, and 8. Further, data item 7 may have attribute values for attributes 1, 3, and 6, and null values for attributes 2, 4, 5, and 7-9, for example.

In one example, an experience of the user may involve hearing a song while enjoying a cup of coffee in New York City, on a Tuesday morning. In this example, the data items of the data item-attribute database may include a file having attributes including a data item-type attribute, a location attribute, and a time attribute. Referring to the example database 200, the file may be data item 7, attribute 1 may be the data item-type attribute, attribute 3 may be the location attribute, and attribute 6 may be the time attribute. The data item-type attribute may indicate that the file is an audio file of the song the user heard. The attribute value associated with this attribute may specify a title of the song. The attribute value may further specify a format of the audio file (e.g. mp3, wmv, etc.). In another case, the data item-type attribute may indicate that the file is an image file including a view of the cup of coffee the user enjoyed. The attribute value associated with this attribute may indicate the type of coffee the user is enjoying and may further specify a format of the image file (e.g. jpeg, gif etc.).

Further, according to such an example, the location attribute associated with the data item may indicate that the location associated with the data item is a city, and an attribute value associated with the city attribute may be New York City. Alternatively, the location attribute associated with the data item may indicate that the location is New York City, and an attribute value associated with the New York City attribute may indicate where in New York City the user heard the song and enjoyed the cup of coffee. For example, the attribute value may include a name of a coffee shop, a street name, or GPS coordinates for where the user heard the song and enjoyed the cup of coffee. In another case, the location attribute associated with the data item may indicate that the user was moving between locations in New York City. The attribute value for this attribute may identify a mode of transportation the user was utilizing when the user heard the song while enjoying the cup of coffee in New York City.

The time attribute associated with the file may indicate a day of the week associated with the file, and an attribute value associated with the day of the week attribute may be Tuesday. Another time attribute associated with the file may indicate a time of day associated with the file, and an attribute value associated with the time of day attribute may be general time frame such as morning, a specific time such as 8:21 am, or specific time frame such as 8:00-9:00 am. In other instances, other time attributes associated with the file may further indicate a month, week, or date associated with the file.

As described above, the data items of the data item-attribute database may be associated with experiences of the user. Accordingly, data items may be added to the database as the user continues to have experiences. The new data items could be added to the database constantly. Alternatively, new data items could be added according to an input indicating that one or more new data items are to be added. In one example, the addition of data items to the database may involve the HMD mentioned above. For example, the user may interact with the HMD to indicate that data items are to be added, and may further indicate that the HMD is to be utilized to acquire the new data items. The interaction between the user and the HMD may involve sensory-input data indicating that a new data item is to be added to the database may be received.

In one instance, the sensory-input data may include physiological data indicating that the user is intrigued by or engaged with elements of the user's surrounding environment according to physiological states of the user. For example, physiological data sensors in communication with the HMD may detect a change in the user's galvanic skin response, indicating the user is intrigued, and accordingly add one or more data items associated with the user's surrounding environment to the database.

In another instance, the sensory-input data may include activation data indicating that the user wishes to add data items to the database based on an action of the user. For example, the user may use a button or touchpad on the HMD, provide a voice command, or perform some other act detectable by the HMD to indicate that one or more data items associated with the user's surrounding environment are to be added to the database. The HMD may then capture a video and/or audio signal representing the user's experience.

Upon receiving the one or more new data items to be added to the data item-attribute database, data specifying one or more attributes from the set of attributes may be associated with the received one or more new data items. In one instance, the data associated with the received one or more data items may further specify one or more attribute values associated with the one or more new data items. Referring to FIG. 2, a data item 10 could be added to the example database 200, and one or more attribute values associated with data item 10 could then populate the corresponding attribute entries for data item 10. In the case an attribute value associated with data item 10 corresponds to a new attribute not already included in example database 200, an additional attribute column for the new attribute could be created.

In some cases, the attributes or attribute values associated with the one or more new data items may indicate a context of the sensory-input data. The associations between data items and their respective attributes and attribute values could be determined by the HMD. Alternatively, the association could be determined by a cloud computing network in communication with the HMD.

In one example, the user may be wearing an HMD while eating pizza at a restaurant in Chicago. If the user particularly enjoys the pizza, physiological data sensors in communication with the HMD may detect a physiological state of the user reflecting the user's enjoyment of the pizza and the HMD may add data items including captured image and/or audio files representing the user's experience to the database. Alternatively, the user may press a button on the HMD to indicate that new data-items including captured image and/or audio files representing the user's experience with the pizza should be added to the database.

In this way, data items including images of the pizza captured by the HMD and audio files recorded by the HMD while the user enjoyed the pizza may be added to the database. Upon adding the new data items to the database, attributes or attribute values may be associated with the new data items, and data specifying the attributes or attribute values may also be added to the database. In this example, the captured image files and recorded audio files may have data item-type attribute values indicating that the captured image files are image files of a certain image format, while the recorded audio files are audio files of a certain audio format. In this example, an image-category attribute may also be associated with the image file data item. For instance, the image-category attribute may indicate that the captured image is a photo of food. Further, location-attribute values of the new data items may include the city Chicago and an address of the pizza restaurant, while time-attribute values of the new data items may include a month, date, and time of day when the user is enjoying the pizza. The time-attribute values may further include a time when the user began enjoying the pizza and when the user finished eating the pizza. After attributes and/or attribute values have been associated with the new data items, the data items may then be added to the data item-attribute database.

In addition to the contexts of the sensory-input data mentioned above, context signals as applied to other sensor-input data may further include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information. Those skilled in the art will understand that the above list of possible context signals and sources of context information is not intended to be limiting, and that other context signals and/or sources of context information are possible in addition, or in the alternative, to those listed above.

In some cases, determining an attribute or attribute value may further involve calculating a quantitative or qualitative value of a single context signal (e.g., the time of the day, a current location, or a user status). The attribute or attribute value may also be determined based on a plurality of context signals (e.g., the time of day, the day of the week, and the location of the user). In other embodiments, a computing system, such as discussed further below with regard to FIG. 8, may extrapolate from the information provided by context signals. For example, a determined user-context may be determined, in part, based on context signals that are provided by a user (e.g., a label for a location such as "work" or "home", or user-provided status information such as "on vacation").

At block 104 of FIG. 1, the method 100 includes receiving first input data indicating a first selection of attributes and/or attribute values from the set of attributes and/or attribute values, respectively. In one case, the first input data may be received in response to a query from the user wishing to search and access data items in the data item-attribute database. The query may be received from the user through the HMD. For example, the HMD may receive an audio input from the user asking, "Where did I have pizza in Chicago?" In this example, the query may be parsed and the terms "pizza" and "Chicago" may be determined as search terms associated with attributes of food and location, respectively. In one instance, the first input data may be generated indicating first attribute selections of "food" and "location." In another instance, the first input data may be generated indicating first attribute value selections of "pizza" and "Chicago." In further instances, the first input data may indicate a combination of first attributes and attribute value selections, such as "food" and "Chicago" or "pizza" and "location," for example.

At block 106, the method 100 includes grouping a first subset of data items from the data item-attribute database into at least a first data item cluster. In one case, each data item in the first data item cluster shares each of the attributes or attribute values of the first selection of attributes or attribute values. Accordingly, the first data item cluster may include a data item or data items the user may be searching for by providing the query. In other words, the first data item cluster may be a search result of the query.

In another case, each data item in the first data item cluster shares at least one attribute or attribute value of the first selection of attributes or attribute values. In this case, the first subset of data items may be grouped into the first data item cluster according to the first selection of attributes or attribute values. In other words, each data item in the data item-attribute database that is associated with at least one attribute or attribute value of the first selection of attributes or attribute values may be included in the first data item cluster.

For example, if the first input data indicates a selected attribute of "food," then the first data item cluster may include each data item in the database that is associated with "food." Analogously, if the first input data indicates a selected attribute value of "Chicago," then the first data item cluster may include each data item in the database that is associated with "Chicago."

In a further case, the first input data may indicate a first selection of attributes or attribute values. In one instance, the first data item cluster may include data items from the database associated with each of the first selection of attributes or attribute values. For example, if the first selection of attributes and attribute values is "food" and "Chicago," then the first data item cluster may include every data item in the database associated with "food" and "Chicago." In another instance, the first data item cluster may include data items from the database associated with any of the first selection attributes or attribute values. For example, the first data item cluster may include every data item in the data base associated with "food" or "Chicago."

In yet another instance, the first data item cluster may include data items from the database associated with a first of the first selection of attributes or attributes values, while a different data item cluster may include data items from the database associated with a second of the first selection of attributes or attribute values, and so forth. For example, the first data item cluster may include every data item in the database associated with "food," while the different data item cluster may include every data item in the database associated with "Chicago."

As discussed above, each data item in the database may be associated with more than one attribute or attribute value. As such, it may be possible for the same data item to be included in more than one data item cluster. For example, the captured image of the pizza enjoyed by the user in Chicago may be included in both the first data item cluster of data items associated with "food" as well as the different data item cluster of data items associated with "Chicago."

FIG. 3A illustrates an example first data item cluster 300 of the data item-attribute database 200 as shown in FIG. 2. As shown, a subset of data items 302 includes data items 1, 5-6, and 9. As applied to the pizza example discussed above, attribute 6 may be a location attribute, and the symbol "□" may represent an attribute value of Chicago, while attribute 3 may be a food attribute, and the symbol "Δ" may represent an attribute value of pizza. In this case, the location attribute may have been selected, and the first data item cluster 300 may be grouped according to the location attribute, attribute 6. As such, the subset of data items 302 may include each data item in the database 200 that has a location attribute value that is not null.

FIG. 3B illustrates an example second data item cluster 310 of the data item-attribute database 200 as shown in FIG. 2. As shown, a subset of data items 312 includes data items 2, 7, and 8. Continuing with the example above, attribute 6 may be a location attribute, and the symbol "□" may represent an attribute value of Chicago, while attribute 3 may be a food attribute, and the symbol "Δ" may represent an attribute value of pizza. In this case, the food attribute value of pizza, represented by the symbol "Δ" may have been selected, and the second data item cluster 300 may be grouped according to the food attribute value of "Δ." As such, the subset of data items 302 may include each data item in the database 200 that has a food attribute value of "Δ," representing pizza.

At block 108 of FIG. 1, the method 100 includes causing a display to provide a first visual indication of the first data item cluster. The display may be any display viewable by the user. In one case, the display may be a display of the HMD through which the query is made by the user. Additional information relating to the display can be found below in connection with FIGS. 5-6. In one case, the first visual indication of the first data item cluster may be in the form of text. For example, the text may indicate an attribute or attribute value that the first data item cluster is grouped by. In another case, the first visual indication of the first data item cluster may be in the form of a graphical icon. For example, the graphical icon representing the first visual indication of the first data item cluster may include one or more symbols indicating one or more attributes or attribute values that the first data item cluster is grouped by. In another example, the graphical icons may include symbols as well as text to indicate attributes or attribute values that the first data item cluster is grouped by.

In a further case, causing the display to provide the first visual indication of the first data item cluster may involve causing the display to provide a visual indication of each data item in the first data item cluster. In one instance, the visual indication of each data item in the first data item cluster may be in the form of text indicating each respective data item. In another instance, the visual indication of each data item in the first data item cluster may be in the form of graphical icons indicating each respective data item. In a further instance, the graphical icons indicating each respective data item may further include text.

In one case, the display may provide the first visual indication of the first data item cluster in the form of an image tile gallery such that the first visual indication of the first data item cluster may be provided as a tile adjacent to tiled representations of visual indications of other data item clusters. In one example, the first data item cluster may be grouped according to a location attribute value of "New York City," and the first visual indication of the first data item cluster may be a tiled representation of a graphic of the Empire State Building.

In another case, the first visual indication of the first data item cluster may be provided such that visual indications of each data item in the first data item cluster are displayed as tiles adjacent to other tiled representations of visual indications of other data items in the first data item cluster. In this case, a representative visual indication of the first data item cluster may also be provided on the display to indicate that each data item represented on the display are included in the first data item cluster. As discussed above, the visual indication may be provided in various forms, including icons, images, or labels. As such, the visual indication of the first data item cluster may include icons representing each of the data items in the first data item cluster, such an image file of the cup of coffee the user enjoyed in New York City, as well as an icon having a symbol representing New York City, for example.

In yet another case, the first visual indication of the first data item cluster may be provided alongside visual indications of other data item clusters grouped according to other attribute values of the same attribute. Continuing with example above, the first attribute value selection is "New York City" and the first data item cluster includes each data item having an attribute value of "New York City." In this case, the first visual indication of the first data item cluster may be provided alongside visual indications of other data item clusters grouped according to other location attribute values, such as "Chicago," "San Francisco," or "Seattle." For example, the tiled representation of the Empire State Building graphic may be provided adjacent to tiled representations of a Willis Tower graphic representing Chicago, a Transamerica Pyramid graphic representing San Francisco, and a Space Needle graphic representing Seattle. Text associated with each tiled representation may also be provided to indicate the attribute or attribute values each data item cluster is grouped by.

In the above cases, when multiple visual indications of data item clusters or data items are provided, the visual indications may be organized according to different parameters, including alphabetical order or chronological order. In one instance, the image tile gallery of the visual indications may further be provided serially in a horizontal, vertical, or diagonal manner. In another instance, the image tile gallery of the visual indications may be provided as tiles of a grid. Additional illustrations of how the display may provide the first visual indication of the first data item cluster can be found below in connection to FIGS. 4A-4J.

At block 110, the method 100 includes receiving second input data indicating a second selection of attributes or attribute values. In one case, the second input data may be received in response to an interaction with the first visual indication of the first data item cluster provided on the display, such that the second selection of attributes or attribute values are of attributes or attribute values associated with data items in the first data item cluster. In this case, a particular data item in the first data item cluster may first be selected before attributes or attribute values associated with the particular data item are selected according to a selection input.

In one example, the first selection of attributes or attribute values is "Chicago" and the first data item cluster includes any data item associated with the attribute value of "Chicago." In one case, the first visual indication of the first data item cluster may be provided alongside visual indications of other data item clusters grouped according to different location attribute values, as described above. In this case, attribute values such as "New York City," "San Francisco," or "Seattle" may be available for selection.

In another case, providing the first visual indication of the first data item cluster may include providing visual indications of each data item in the first data item cluster. In this case, only attributes or attribute values associated with data items in the first data item cluster may be available for selection. For instance, the attribute of "food" or the attribute value of "pizza" may be selected because the first data item cluster grouped based on the attribute value "Chicago" may include the image file of the pizza the user enjoyed in Chicago, as mentioned above.

In some cases, the display providing the visual indications of data item clusters or data items may not be large enough to accommodate all visual indications of data items clusters or data items provided. As such, only a portion of the visual indications may be viewable on the display at a given time. In this case, the user may interact with the display to view portions of the visual indications not viewable at the given time. For example, the user may perform an action to cause scrolling of the image tile gallery of visual indications described above to view the selectable attributes and attribute values associated with visual indication not viewable at the given time.

After viewing visual indications of at least the first data item cluster, the user may further interact with the display such that the second input data indicating the second selection of attributes or attribute values may be received. In one case, the second input data may include a cursor movement input indicating cursor movement over a visual indication of interest provided on the display and a selection input indicating the selection of the visual indication of interest, which may be representative of a data item, attribute, or attribute value. In one example, the cursor may move according to the movement of a computer mouse or movement on a track-pad, and the selection input may be provided in response to a clicking of the mouse or a tapping on the track-pad by the user while the cursor is positioned over the visual indication of interest.

In another case, the cursor may be at stationary location on the display and scrolling of the image tile gallery of visual indications may shift the visual indications across the display such that a visual indication of interest may be shifted to the stationary location of the cursor. Once the visual indication of interest is at the stationary location of the cursor, the select input may be provided to select the visual indication of interest.

In either of the above cases, viewing and selecting the visual indications may be executed iteratively. For instance, the selection of a visual indication of a data item may prompt visual indications of attributes and attribute values associated with the data item to be provided, after which viewing and selecting of the provided attributes or attribute values may be executed. Additional information relating to the viewing and selecting of visual indications can be found below in connection with FIGS. 4A-4J.

As described above, the physiological states of the user may be detected by physiological data sensors in communication with the HMD. In this case, if the user wearing the HMD is using the HMD to search and access the data items in the data item-attribute database, scrolling of the image tile gallery and the subsequent selection of the visual indication of interest may be executed according to physiological states of the user. In one instance, the HMD may be configured such that physiological states of the user may correspond to directional scrolling of the image tile gallery of visual indications. In one case, the physiological states of the user may correspond to axial movements of the HMD. For example, if the head of the user turns toward the left, the HMD will accordingly turn toward the left, and the axial movement of the HMD toward the left may correspond to scrolling of the image tile gallery toward the left. Upward, downward, and rightward scrolling of the image tile gallery may also be implemented accordingly.

In another case, physiological data sensors in communication with the HMD may include an eye-tracking device configured to track the eye movement of the user. For example, movement of the eyes may be detected and a quick movement of the eyes in a direction may be configured to correspond to scrolling the image tile gallery in the direction of the eye movement. In another example, the cursor on the display providing the visual indications may be configured to move according to movements of the eye. For instance, the eye-tracking device may provide eye-tracking data indicating the user's attention to a particular region of the display, and the cursor may accordingly be moved to the particular region.

As mentioned above, the selection of the visual indication of interest may also be executed according to physiological states of the user. Once the cursor and the visual indication of interest are overlaid, either by moving the cursor, shifting the visual indications, or both, a physiological state of the user may be received indicating a selection of the visual indication of interest. In one case, the physiological state indicating the selection may correspond to an axial movement of the HMD. For example, the user may select the visual indication of interest by a quick nod of the head.

In another case, the physiological state indicating the selection may be detected by the eye-tracking device. In one example, a selection of the visual indication of interest may be made if the eye-tracking data indicates an extended user attention to the particular region of the display where the visual indication of interest is provided. In other words, if the user is looking at the visual indication of interest for an extended period of time (e.g. one full second), the visual indication of interest may be selected. In another example, a selection of the visual indication of interest may be configured to correspond to three blinks of the eye once the cursor and the visual indication of interest are overlaid.

At block 112, the method 100 includes grouping a second subset of data items from the data item-attribute database into at least a second data item cluster. Similar to block 106 discussed above, each data item in the second data item cluster shares at least one of the one or more second selected attributes. As such, the second subset of data items may be grouped into the second data item cluster according to the second selection of attributes or attribute values. Note that in this case, each data item in the data item-attribute database associated with the second selection of attributes or attribute values may be included in the second data item cluster. In another case, the grouping of the second subset of data items may be a subset of the first subset of data items in the first data item cluster, previously grouped according the first selection of attributes or attribute values.

FIG. 3C illustrates an example third data item cluster 320 of the data item-attribute database 200 as shown in FIG. 2. Continuing with the example above in reference to FIG. 3B and method 100, a selection 314 in second data item cluster 310 may correspond to the second selection of attributes or attribute values. In this case, the selection 314 may be the location attribute value "□" representing Chicago. Accordingly, the third data item cluster 320 includes a subset of data items 322 which includes each data item in the database 200 that has a location attribute value of "□" representing Chicago.

At block 114 of FIG. 1, the method 100 includes causing the display to provide a second visual indication of the second data item cluster. Block 114 may be similar to block 108 in that providing the visual indication of the second data item cluster may be similar to the display providing the first visual indication of the first data item cluster described above. Further, blocks 110-114 may be executed iteratively while the user searches for data items associated with previous experiences of the user or data items available on a database accessible via a network, such as the internet.

Continuing with the example above in reference to FIG. 3C, further selections of attributes or attribute values may be made from among attributes and attribute values associated with the subset of data items 322 included in the third data item cluster 320. In one case, more than one attribute or attribute value may be selected.

FIG. 3D illustrates an example fourth data item cluster 330 of the data item-attribute database 200 as shown in FIG. 2. In this case, selections 324 and 326 of the food attribute, attribute 3, and the attribute value "□" representing Chicago, respectively, may be made from the third data item cluster 320 shown in FIG. 3C. In one case, as discussed earlier, and shown here, the fourth data item cluster 330 includes a subset of data items 332 that has both an attribute 3 that is not null, and an attribute value of "□" representing Chicago. In another case, a fifth data item cluster may include a subset of data items that has either an attribute 3 that is not null, or an attribute value of "□" representing Chicago (not shown).

At block 116, the method 100 includes receiving third input data indicating a third selection of a data item from the second data item cluster. Similar to block 110, the viewing and selection of the data item may be executed in a variety of ways. In the case of selecting the data item from the second data item cluster, an actual data item, which may be a picture file, video file, audio file, word-processing file, or e-mail file, may be selected rather than attribute or attribute values associated with the data item. As such, instead of further grouping of data items according to attributes or attribute values as discussed above in connection to blocks 106 and 114, different computing actions may be executed once the data item has been selected. In some cases, block 116 may be executed after block 108 when the first visual indication of the first data item cluster is provided, without the second selection of attributes or attribute values, and without the second grouping of data items according to the second selection of attributes or attribute values. In other cases, block 116 may be executed after multiple iterations of blocks 110-112 have been executed, while the user continues to search for data items associated with previous experiences or data items available on a database accessible via a network, such as the internet.

As mentioned above, a computing action on the selected data item may be executed, instead of further grouping of data items according to attributes or attribute values. At block 118, the method 100 includes executing a computing action based on the third selection of the data item from the second data item cluster. For example, if the data item is a video file, the computing action may include loading the video file and providing the video on the display. In another example, if the data item is an audio file, the computing action may include loading the audio file for the user to listen to. In this case, if the audio file is a recording of a song, the computing action may further include recognizing the song and prompting the user to acquire a professional recording of the song.

In yet another example, if the data item is an image file, the computing action may include loading the image file for the user to view. In this case, the computing action may further include prompting the user to send the image file to friends via multimedia messaging services (MMS) or email. Further in this case, a list of contacts may be suggested as recipients of the image file based on attributes or attribute values of the image file. For instance, the image file may be a photo captured by the user, and attribute values associated with the image file may include names of friends present when the photo was captured. The friends present when the photo was captured, as indicated by the associated attribute values, may then be included in the list of suggested recipients.

3. EXAMPLE DATA ITEM SEARCHING INTERFACE

FIGS. 4A-4J illustrate an example series of views of a user-interface 400 provided to a user while a user searches through user-experience content, for example, according to method 100 discussed above in connection with FIG. 1. Note that the user-interface examples mentioned above are for purposes of example only. Accordingly, those skilled in the art will appreciate that other arrangements with different visual indications on the user-interface or sequences of views of the user interface can be used instead. Further, some visual indications or sequences of views of the user interface may be omitted altogether according to the desired.

Figure 4A:
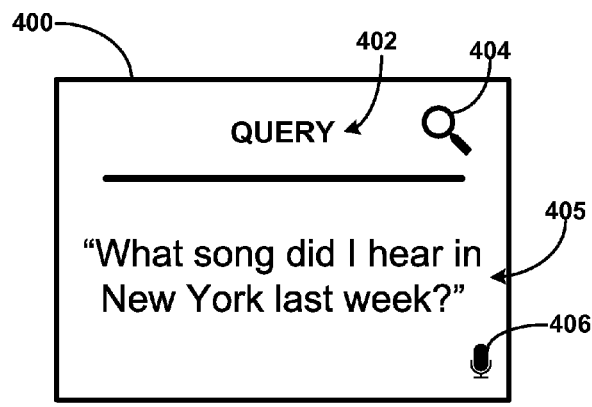
FIG. 4A illustrates a first view of a series of example user-interface views for searching user-experience content.

FIG. 4A illustrates a first view of the user-interface 400 views for searching user-experience content. As shown, the user-interface 400 includes a mode status indication 402, a mode indication 404, a received query indication 405, and a microphone icon 406. In this view, the mode indication 404 may be a search glass icon indicating that the user-interface 400 is in a search mode. In this case, the mode status indication 402 may indicate that the status of the search mode is "QUERY," indicating that a query may be made, and the microphone icon 406 may indicate that a microphone is activated to receive the query as an audio input. As such, the received query indication 405 may be text indicating that the audio input has been received and has been recognized. In this instance, the query may be "What song did I hear in New York last week?" Note that while this example series of user-interface views begins with a query mode, searches for user-experience content may begin in other modes, as well. For instance, the data items may be initially presented in chronological order, or alphabetical order.

In one example, the query of "What song did I hear in New York last week?" may be recognized and parsed such that a single data item cluster of songs the user experienced in New York the previous week may be provided for the user to view. In other words, data items having each attribute or attribute values of song, New York, and times within the previous week may be provided. In one case, the user may browse through the list of data items and select a data item the user may be searching for. In another case, the user may wish to browse other data items associated with the attribute or attribute values associated with the query.

Figure 4B:
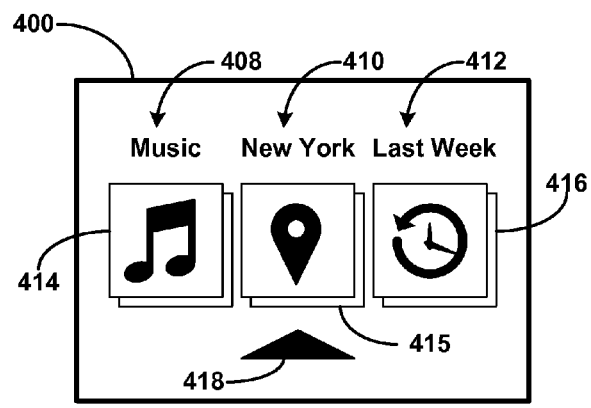
FIG. 4B illustrates a second view of a series of example user-interface views for searching user-experience content.

FIG. 4B illustrates a second view of the user-interface 400 for searching user-experience content. Once the query 405 has been recognized and parsed, data items may be grouped in data item clusters and visual indications of the data item clusters may be provided. As shown, the user-interface 400 includes a cursor 418, and a horizontally displayed image tile gallery of data item cluster visual indications grouped according to the attributes and attribute values of "Music," "New York," and "Last Week," as indicated by text indications 408, 410, and 412, and graphical icon indications 414, 415, and 416, respectively. In this view, the cursor 418 may be stationary, and selection of a data item cluster visual indication may involve scrolling the horizontally displayed image tile gallery. As shown, the data item cluster grouped by the attribute value "New York" may be aligned with the stationary cursor, and may be selected.

Figure 4C:
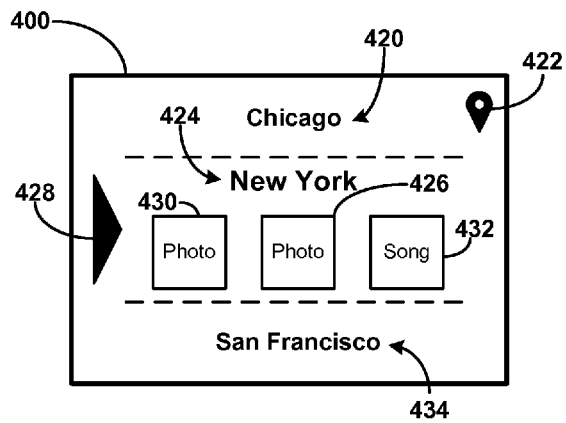
FIG. 4C illustrates a third view of a series of example user-interface views for searching user-experience content.

FIG. 4C illustrates a third view of the user-interface 400 for searching user-experience content. As shown, the user-interface 400 includes a cursor 428, an attribute icon 422, data cluster attribute values 424, 420, and 434, and data items 430, 426, and 432. In this example, the attribute icon 422 may be provided to indicate that the data items are currently grouped according to an attribute, which in this case may be the location attribute. If the "New York" data item cluster has been selected as discussed above in connection with FIG. 4B, data items in the data item cluster may be provided along with other attribute values by which data item clusters may be grouped.

In this view, data items 430, 426, and 432 are data items included in the "New York" data item cluster as indicated by the data item cluster attribute value 424 stating "New York." In this example, the data items 430, 426, and 432 may be provided as a horizontally displayed image tile gallery. In addition, data item cluster attribute values 420 and 434 stating "Chicago" and "San Francisco," respectively, may be provided to indicate that data item clusters grouped according to attribute values "Chicago" and "San Francisco" may also be provided. In this example, the data item cluster attribute values 420, 424, and 434 may be provided as a vertically partitioned display. In this case, the cursor 428 may also be stationary, and selection of a data item cluster attribute values may involve vertically scrolling the vertically partitioned display of data item cluster attribute values. As shown, the data item cluster attribute values "Chicago" and "San Francisco" positioned above and below the "New York" data item cluster may indicate that a "Chicago" data item cluster and a "San Francisco" data item cluster may be viewed by scrolling up or down, respectively.

Figure 4D:
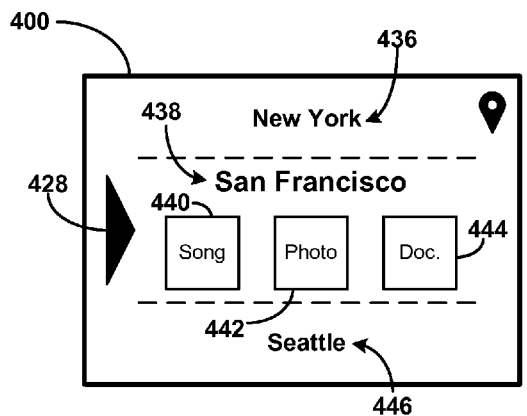
FIG. 4D illustrates a fourth view of a series of example user-interface views for searching user-experience content.

FIG. 4D illustrates a fourth view of the user-interface 400 for searching user-experience content. As shown, the user-interface 400 includes data item cluster attribute values 436, 438, and 446, and data items 440, 442, and 444. In one example, this view may be provided after scrolling down from the view of the user-interface 400 in FIG. 4C, such that the "San Francisco" data item cluster is aligned with the cursor 428 and may be selected. Accordingly, "San Francisco" data items 440, 442, and 444 take the places of "New York" data items 430, 426, and 432 on the user-interface 400, and the data item cluster attribute value 438 stating "San Francisco" replaces the data item cluster attribute value 424 stating "New York" on the user-interface 400. The data item cluster attribute value 436 stating "New York" positioned above the "San Francisco" data item cluster attribute may indicate that the user-interface 400 may return to the view of the "New York" data item cluster by scrolling up. Similarly, the data item cluster attribute value 446 stating "Seattle" may indicate that a "Seattle" data item cluster may be viewed on the user-interface 400 by scrolling down.

Figure 4E:
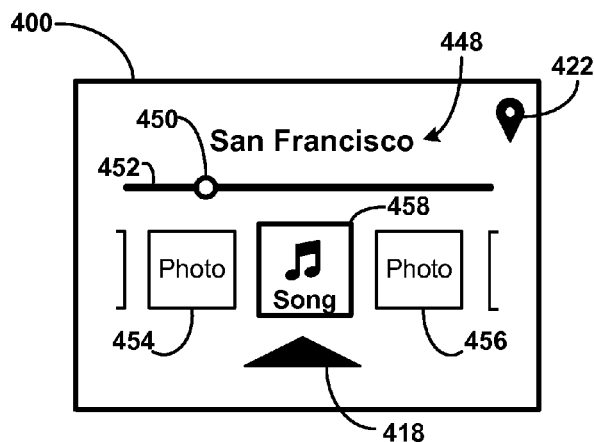
FIG. 4E illustrates a fifth view of a series of example user-interface views for searching user-experience content.

FIG. 4E illustrates a fifth view of the user-interface 400 for searching user-experience content. As shown, the user-interface 400 includes the attribute icon 422, the cursor 418, data item cluster attribute value 448 stating "San Francisco," an index bar 452, an index bar tab 450, and "San Francisco" data items 454, 458, and 456 provided as a horizontal image tile gallery. With reference to FIG. 4D, this view may be provided after the "San Francisco" data item cluster has been selected. In this view, the "San Francisco" data items 454, 458, and 456 shown may be a subset of all data items having an attribute value of "San Francisco." In this case, the horizontal image tile gallery may be scrolled to the left or right to view other "San Francisco" data items. To assist with the viewing of data items, the index bar tab 450 on the index bar 452 may provide a visual indication of the quantity of "San Francisco" data items available to be viewed and how many of the data items are out of the current view, or that the user has not yet viewed. In another example not shown, the visual indication of the quantity of data items available to be viewed may also be provided as text, such as "6 out of 54 total items" or "6/54."

In this view, data item 458 may be aligned with the cursor 418 and may appear magnified or highlighted to further emphasize that data item 458 is aligned with the cursor 418. In some cases, a magnified visual indication of the data item may further include additional visual information associated with the data item. In this example, the magnified visual indication of data item 458 may include a graphical icon indicating that data item is a music file. If the user is interested in the data item 458, the user may then select the data item 458.

Figure 4F:
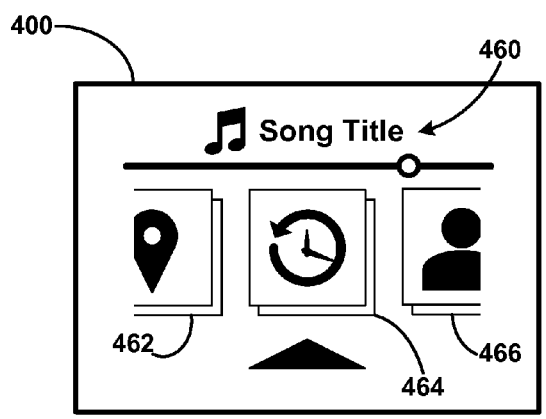
FIG. 4F illustrates a sixth view of a series of example user-interface views for searching user-experience content.

FIG. 4F illustrates a sixth view of the user-interface 400 for searching user-experience content. As shown, the user-interface 400 includes an attribute value 460, and data item clusters 462, 464, and 466 associated with the selected data item 458 of FIG. 4E. In this view, since data item 458 is a music file, the attribute value 460 may state the file name of the data item 458, or the song title if the data item 458 is a recording of a song. Further, data item clusters 462, 464, and 466 may include data items or attribute values grouped according to different attributes associated with the data item 458. For instance, the data item 458 may have a location attribute, a time attribute, and a contact attribute. In the case in which data item 458 is a music file of a song the user has heard, data item cluster 462 may include location attribute values of locations where the user has heard the song and data items associated with the locations the user has heard the song. Similarly, data item cluster 464 may include time attribute values of times when the user has heard the song and data items associated with the time the user has heard the song, and data item cluster 466 may include contact attribute values indicating contacts of the user that were present when the user heard the song and data items associated with the contacts that were present when the user heard the song. As shown, data item cluster 464, indicating time attribute values of times associated with the music file 458 is aligned with the cursor 418 and may be selected.

Figure 4G:
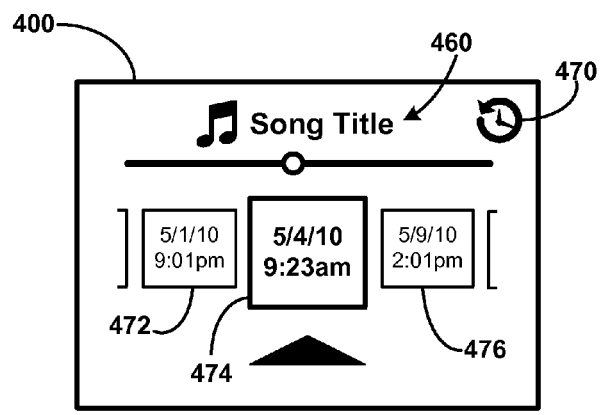
FIG. 4G illustrates a seventh view of a series of example user-interface views for searching user-experience content.

FIG. 4G illustrates a seventh view of the user-interface 400 for searching user-experience content. As shown, the user-interface 400 includes the attribute value 460 of FIG. 4F, an attribute icon 470, and time attribute values 472, 474, and 476 which may be attribute values included in the data item cluster 464 which may have been selected in reference to FIG. 4F. In this view, the attribute icon 470 may be provided to indicate that the data items are currently grouped according to an attribute, which in this case may be the time attribute. In this example, time attribute values 472, 474, and 476 may all be dates and times of the dates when the user heard the song associated with data item 458 of FIG. 4E, and may be provided as a horizontal image tile gallery. The graphical icons representing time attribute values 472, 474, and 476 may state the dates and times of the dates when the user heard the song.

For example, the graphical icon 474 may state "5/4/10" as the date, and "9:23 am" as the time. Other time attribute value graphical icons included in the data item cluster 464 of FIG. 4F, but may be presently out of view, may be viewed by horizontal scrolling of the image tile gallery. Accordingly, the user may view the different time attribute value graphical icons, and a specific date and time attribute value indicating when the user heard the song may be selected. In this case, the date "5/4/10" and the time "9:23 am" may be selected.

Figure 4H:
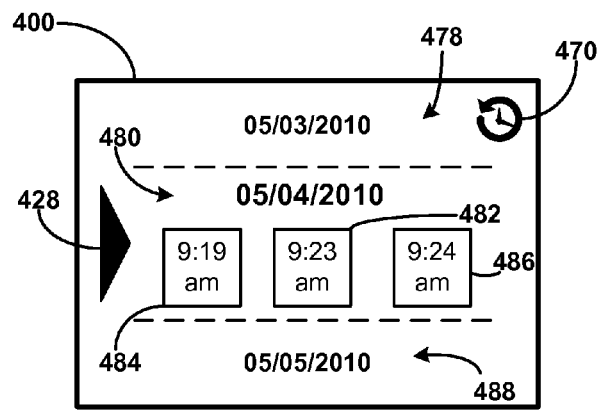
FIG. 4H illustrates an eighth view of a series of example user-interface views for searching user-experience content.

FIG. 4H illustrates an eighth view of the user-interface 400 for searching user-experience content. As shown, the user-interface 400 includes the attribute icon 470 indicating that the data items are currently grouped according to the time attribute, the cursor 428, data item cluster attribute values 478, 480, and 488, and time attribute value graphical icons 484, 482, and 486. With reference to FIG. 4G, data items associated with the selected time attribute value 474 may be grouped into a data item cluster and provided upon the selection of a time attribute value 475 indicating when the user heard the song.

In the view of FIG. 4H, the time attribute may further be grouped into data item clusters according to the day associated with the data items. In this example, the data item cluster attribute values 478, 480, and 488 may indicate the date associated with the data items included in the respected data item clusters. For instance, the selected time attribute value 474 of "5/4/10" and "9:23 am" may now be represented as the time attribute graphical icon 482 indicating "9:23 am," in the data item cluster associated with the date "5/4/10." As shown, the data item clusters grouped according to dates may be provided as a vertically partitioned display, and a preview of time attribute values included in each data item clusters grouped according to dates may be viewed by vertical scrolling. The data item cluster grouped according to dates that may be aligned with the cursor 428 may then be selected.

Figure 4I:
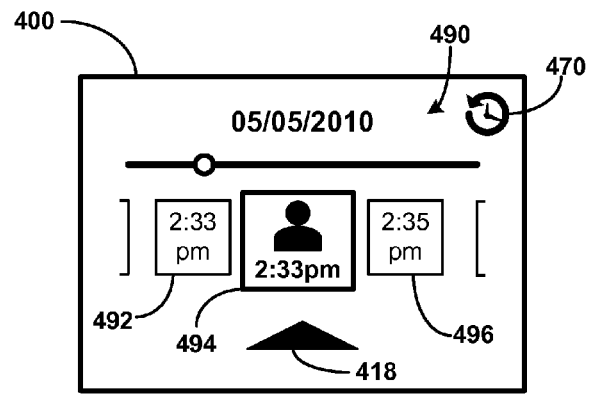
FIG. 4I illustrates a ninth view of a series of example user-interface views for searching user-experience content.

FIG. 4I illustrates a ninth view of the user-interface 400 for searching user-experience content. As shown, the user-interface 400 includes the cursor 418, the attribute icon 470 indicating that the data items are currently grouped according to the time attribute, a data item cluster attribute value 490, and data items 492, 494, and 496. With reference to FIG. 4H, the data item cluster grouped according to the date attribute value "05/05/2010" may be selected after scrolling through the different data item clusters grouped by dates. In this view, data items 492, 494, and 496 included in the "05/05/2010" data item cluster may be sorted by time attribute values of the data items, and provided as a horizontal image tile gallery. As such, the different data items in the "05/05/2010" data item cluster may be viewed by horizontal scrolling, and a data item aligned with the cursor 418 may be selected. In this case, data item 494 may indicate that on the date "05/05/2010" the user interacted with a contact at the time "2:33 pm," and may be selected.

Figure 4J:
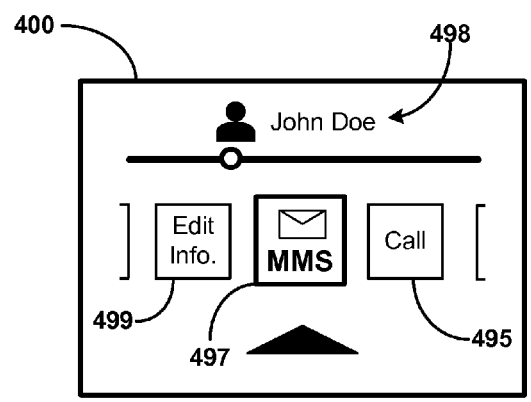
FIG. 4J illustrates a tenth view of a series of example user-interface views for searching user-experience content.

FIG. 4J illustrates a tenth view of the user-interface 400 for searching user-experience content. As shown, the user-interface 400 includes an attribute value 498, and graphical icons 499, 497, and 495. In this view, the attribute value 498 may include contact information of the contact the user interacted with at "2:33 pm" on "05/05/10" as indicated by the selected data item 494 of FIG. 4I. In one example, the graphical icons may represent computing actions that may be executed as relevant to the selected data item 494. In this example, the graphical icon 499 may represent the computing action to edit contact information for the contact, the graphical icon 497 may represent the computing action to send the contact a message via MMS, and the graphical icon 495 may represent the computing action to call the contact on the phone. Upon selection of one of the graphical icons representing the respective computing actions, subsequent actions for executing the selected computing actions may take place. The graphical icons may also represent data associated with the selected data item 494 or data items associated with the selected data item 494. In one case, data associated with the selected data item 494 may include contact information in addition to contact information included in the attribute value 498. In another case, data items associated with the selected data item 494 may include other data items sharing at least one attribute or attribute value with the selected data item 494, as discussed previously.

As mentioned above, the user-interface examples described above are for purposes of example only, and accordingly, those skilled in the art will appreciate that other arrangements with different visual indications on the user-interface or sequences of views of the user interface can be used instead. Further, some visual indications or sequences of views of the user interface may be omitted altogether according to the desired results.

4. EXAMPLE SYSTEM AND DEVICE ARCHITECTURE

Figure 5A:
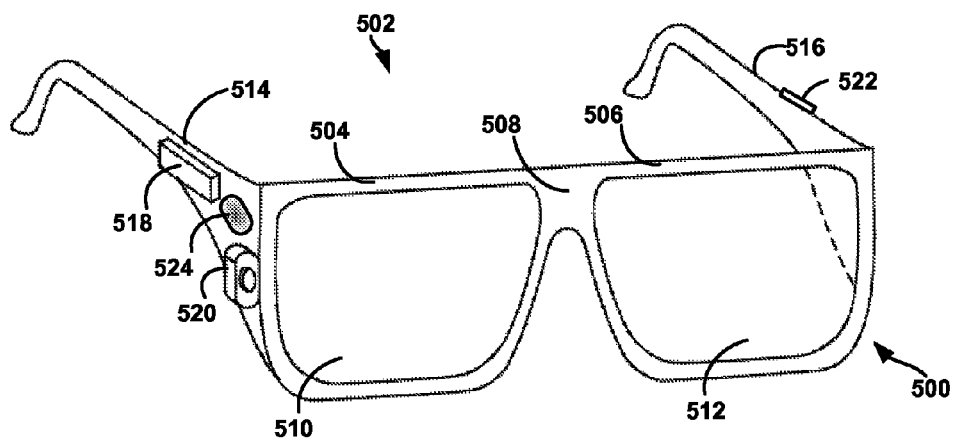
FIG. 5A illustrates an example system for receiving, transmitting, and displaying data.

FIG. 5A illustrates an example system 500 for receiving, transmitting, and displaying data. The system 500 is shown in the form of a wearable computing device, which may be implemented as the HMD discussed above, for data item searching. While FIG. 5A illustrates a head-mounted device 502 as an example of a wearable computing device, other types of wearable computing devices could additionally or alternatively be used. As illustrated in FIG. 5A, the head-mounted device 502 has frame elements including lens-frames 504, 506 and a center frame support 508, lens elements 510, 512, and extending side-arms 514, 516. The center frame support 508 and the extending side-arms 514, 516 are configured to secure the head-mounted device 502 to a user's face via a user's nose and ears, respectively.

Each of the frame elements 504, 506, and 508 and the extending side-arms 514, 516 may be formed of a solid structure of plastic and/or metal, or may be formed of a hollow structure of similar material so as to allow wiring and component interconnects to be internally routed through the head-mounted device 502. Other materials may be possible as well.

One or more of each of the lens elements 510, 512 may be formed of any material that can suitably display a projected image or graphic. Each of the lens elements 510, 512 may also be sufficiently transparent to allow a user to see through the lens element. Combining these two features of the lens elements may facilitate an augmented reality or heads-up display where the projected image or graphic is superimposed over a real-world view as perceived by the user through the lens elements 510, 512.

The extending side-arms 514, 516 may each be projections that extend away from the lens-frames 504, 506, respectively, and may be positioned behind a user's ears to secure the head-mounted device 502 to the user. The extending side-arms 514, 516 may further secure the head-mounted device 502 to the user by extending around a rear portion of the user's head. Additionally or alternatively, for example, the system 500 may connect to or be affixed within a head-mounted helmet structure. Other possibilities exist as well.

The system 500 may also include an on-board computing system 518, a video camera 520, a sensor 522, and a finger-operable touch pad 524. The on-board computing system 518 is shown to be positioned on the extending side-arm 514 of the head-mounted device 502; however, the on-board computing system 518 may be provided on other parts of the head-mounted device 502 or may be positioned remote from the head-mounted device 502 (e.g., the on-board computing system 518 could be connected by wires or wirelessly connected to the head-mounted device 502). The on-board computing system 518 may include a processor and memory, for example. The on-board computing system 518 may be configured to receive and analyze data from the video camera 520, the sensor 522, and the finger-operable touch pad 524 (and possibly from other sensory devices, user-interfaces, or both) and generate images for output by the lens elements 510 and 512. The on-board computing system 518 may additionally include a speaker or a microphone for user input (not shown). An example computing system is further described below in connection with FIG. 8.

The video camera 520 is shown positioned on the extending side-arm 514 of the head-mounted device 502; however, the video camera 520 may be provided on other parts of the head-mounted device 502. The video camera 520 may be configured to capture images at various resolutions or at different frame rates. Video cameras with a small form-factor, such as those used in cell phones or webcams, for example, may be incorporated into an example embodiment of the system 500.

Further, although FIG. 5A illustrates one video camera 520, more video cameras may be used, and each may be configured to capture the same view, or to capture different views. For example, the video camera 520 may be forward facing to capture at least a portion of the real-world view perceived by the user. This forward facing image captured by the video camera 520 may then be used to generate an augmented reality where computer generated images appear to interact with the real-world view perceived by the user.

The sensor 522 is shown on the extending side-arm 516 of the head-mounted device 502; however, the sensor 522 may be positioned on other parts of the head-mounted device 502. The sensor 522 may include one or more of a gyroscope or an accelerometer, for example. Other sensing devices may be included within, or in addition to, the sensor 522 or other sensing functions may be performed by the sensor 522.

The finger-operable touch pad 524 is shown on the extending side-arm 514 of the head-mounted device 502. However, the finger-operable touch pad 524 may be positioned on other parts of the head-mounted device 502. Also, more than one finger-operable touch pad may be present on the head-mounted device 502. The finger-operable touch pad 524 may be used by a user to input commands. The finger-operable touch pad 524 may sense at least one of a position and a movement of a finger via capacitive sensing, resistance sensing, or a surface acoustic wave process, among other possibilities. The finger-operable touch pad 524 may be capable of sensing finger movement in a direction parallel or planar to the pad surface, in a direction normal to the pad surface, or both, and may also be capable of sensing a level of pressure applied to the pad surface. The finger-operable touch pad 524 may be formed of one or more translucent or transparent insulating layers and one or more translucent or transparent conducting layers. Edges of the finger-operable touch pad 524 may be formed to have a raised, indented, or roughened surface, so as to provide tactile feedback to a user when the user's finger reaches the edge, or other area, of the finger-operable touch pad 524. If more than one finger-operable touch pad is present, each finger-operable touch pad may be operated independently, and may provide a different function.

Figure 5B:
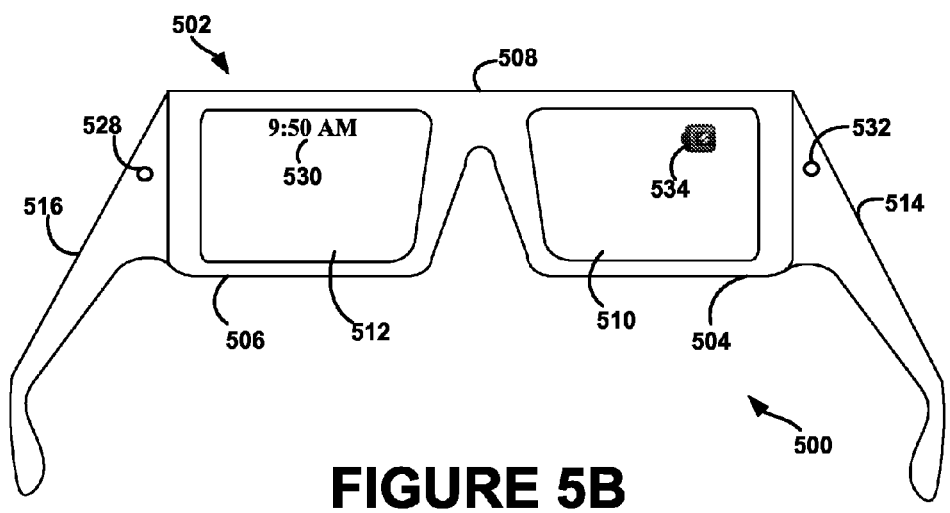
FIG. 5B illustrates an alternate view of the system illustrated in FIG. 5A.

FIG. 5B illustrates an alternate view of the system 500 illustrated in FIG. 5A. As shown in FIG. 5B, the lens elements 510, 512 may act as display elements. The head-mounted device 502 may include a first projector 528 coupled to an inside surface of the extending side-arm 516 and configured to project a display 530 onto an inside surface of the lens element 512. Additionally or alternatively, a second projector 532 may be coupled to an inside surface of the extending side-arm 514 and configured to project a display 534 onto an inside surface of the lens element 510.

The lens elements 510, 512 may act as a combiner in a light projection system and may include a coating that reflects the light projected onto them from the projectors 528, 532. In some embodiments, a reflective coating may be omitted (e.g., when the projectors 528, 532 are scanning laser devices).

In alternative embodiments, other types of display elements may also be used. For example, the lens elements 510, 512 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 504, 506 for driving such a matrix display. Alternatively or additionally, a laser or light emitting diode (LED) source and scanning system could be used to draw a raster display directly onto the retina of one or more of the user's eyes. Other possibilities exist as well.

Figure 6A:
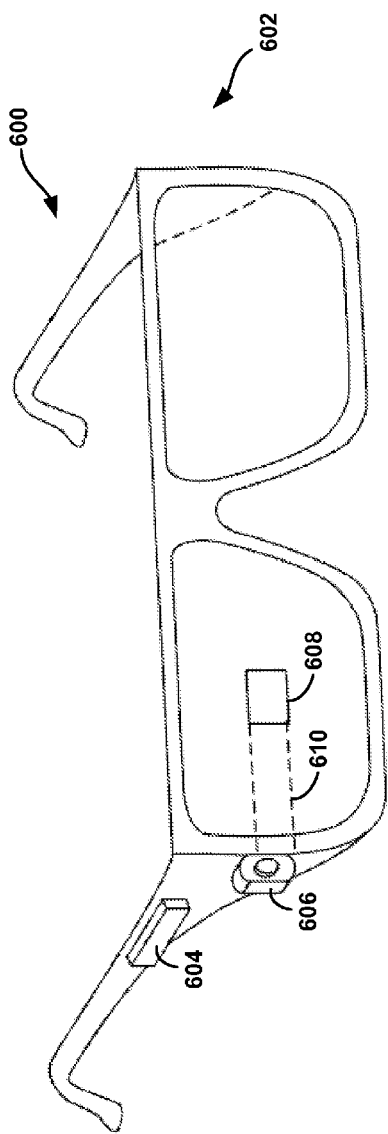
FIG. 6A illustrates another example system for receiving, transmitting, and displaying data.

FIG. 6A illustrates an example system 600 for receiving, transmitting, and displaying data. The system 600 is shown in the form of a wearable computing device 602, which may be implemented as the HMD discussed above, for data item searching. The wearable computing device 602 may include frame elements and side-arms such as those described with respect to FIGS. 5A and 5B. The wearable computing device 602 may additionally include an on-board computing system 604 and a video camera 606, such as those described with respect to FIGS. 5A and 5B. The video camera 606 is shown mounted on a frame of the wearable computing device 602; however, the video camera 606 may be mounted at other positions as well.

As shown in FIG. 6A, the wearable computing device 602 may include a single display 608 which may be coupled to the device. The display 608 may be formed on one of the lens elements of the wearable computing device 602, such as a lens element described with respect to FIGS. 5A and 5B, and may be configured to overlay computer-generated graphics in the user's view of the physical world. The display 608 is shown to be provided in a center of a lens of the wearable computing device 602, however, the display 608 may be provided in other positions. The display 608 is controllable via the computing system 604 that is coupled to the display 608 via an optical waveguide 610.

Figure 6B:
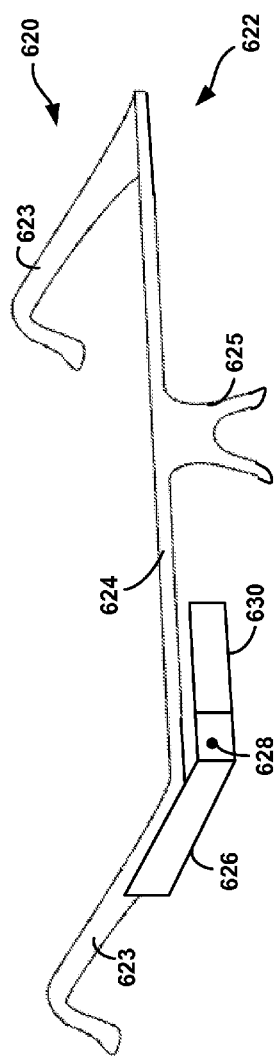
FIG. 6B illustrates yet another example system for receiving, transmitting, and displaying data.

FIG. 6B illustrates an example system 620 for receiving, transmitting, and displaying data. The system 620 is shown in the form of a wearable computing device 622. The wearable computing device 622 may include side-arms 623, a center frame support 624, and a bridge portion with nosepiece 625. In the example shown in FIG. 6B, the center frame support 624 connects the side-arms 623. The wearable computing device 622 does not include lens-frames containing lens elements. The wearable computing device 622 may additionally include an on-board computing system 626 and a video camera 628, such as those described with respect to FIGS. 5A and 5B.

The wearable computing device 622 may include a single lens element 630 that may be coupled to one of the side-arms 623 or the center frame support 624. The lens element 630 may include a display such as the display described with reference to FIGS. 5A and 5B, and may be configured to overlay computer-generated graphics upon the user's view of the physical world. In one example, the single lens element 630 may be coupled to a side of the extending side-arm 623. The single lens element 630 may be positioned in front of or proximate to a user's eye when the wearable computing device 622 is worn by a user. For example, the single lens element 630 may be positioned below the center frame support 624, as shown in FIG. 6B.

FIG. 7 shows a simplified block diagram of an example computer network infrastructure. In system 700, a device 710 communicates using a communication link 720 (e.g., a wired or wireless connection) to a remote device 730. The device 710 may be any type of device that can receive data and display information corresponding to or associated with the data. For example, the device 710 may be a heads-up display system, such as the head-mounted device 502, 600, or 620 described with reference to FIGS. 5A-6B.

Thus, the device 710 may include a display system 712 including a processor 714 and a display 716. The display 716 may be, for example, an optical see-through display, an optical see-around display, or a video see-through display. The processor 714 may receive data from the remote device 730, and configure the data for display on the display 716. The processor 714 may be any type of processor, such as a microprocessor or a digital signal processor, for example.

The device 710 may further include on-board data storage, such as memory 718 coupled to the processor 714. The memory 718 may store software that can be accessed and executed by the processor 714, for example.

The remote device 730 may be any type of computing device or transmitter including a laptop computer, a mobile telephone, or tablet computing device, etc., that is configured to transmit data to the device 710. The remote device 730 and the device 710 may contain hardware to enable the communication link 720, such as processors, transmitters, receivers, antennas, etc.

In FIG. 7, the communication link 720 is illustrated as a wireless connection; however, wired connections may also be used. For example, the communication link 720 may be a wired serial bus such as a universal serial bus or a parallel bus, among other connections. The communication link 720 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 730 may be accessible via the Internet and may include a computing cluster associated with a particular web service (e.g., social-networking, photo sharing, address book, etc.).

Figure 8:
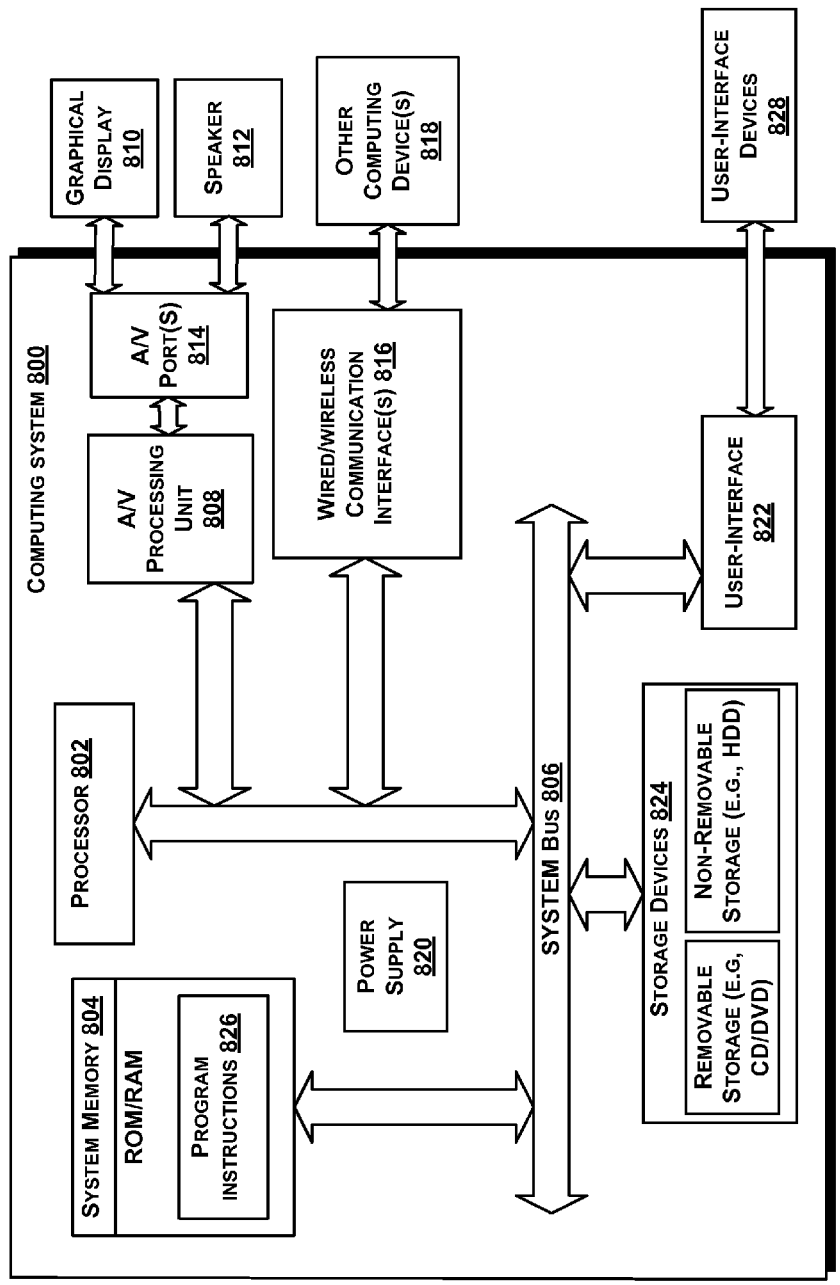
FIG. 8 shows a simplified block diagram depicting example components of an example computing system.

As described above in connection with FIGS. 5A-6B, an example wearable computing device may include, or may otherwise be communicatively coupled to, a computing system, such as computing system 518 or computing system 604. FIG. 8 shows a simplified block diagram depicting example components of an example computing system 800. One or both of the device 710 and the remote device 730 may take the form of computing system 800.

Computing system 800 may include at least one processor 802 and system memory 804. In an example embodiment, computing system 800 may include a system bus 806 that communicatively connects processor 802 and system memory 804, as well as other components of computing system 800. Depending on the desired configuration, processor 802 can be any type of processor including, but not limited to, a microprocessor (μP), a microcontroller (μC), a digital signal processor (DSP), or any combination thereof. Furthermore, system memory 804 can be of any type of memory now known or later developed including but not limited to volatile memory (such as RAM), non-volatile memory (such as ROM, flash memory, etc.) or any combination thereof.

An example computing system 800 may include various other components as well. For example, computing system 800 includes an A/V processing unit 808 for controlling graphical display 810 and speaker 812 (via A/V port 814), one or more communication interfaces 816 for connecting to other computing devices 818, and a power supply 820. Graphical display 810 may be arranged to provide a visual depiction of various input regions provided by user-interface module 822. For example, user-interface module 822 may be configured to provide a user-interface, such as the example user-interface described below in connection with FIGS. 9A-D, and graphical display 810 may be configured to provide a visual depiction of the user-interface. User-interface module 822 may be further configured to receive data from and transmit data to (or be otherwise compatible with) one or more user-interface devices 828.

Furthermore, computing system 800 may also include one or more data storage devices 824, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 800.

According to an example embodiment, computing system 800 may include program instructions 826 that are stored in system memory 804 (and/or possibly in another data-storage medium) and executable by processor 802 to facilitate the various functions described herein including, but not limited to, those functions described with respect to FIG. 1. Although various components of computing system 800 are shown as distributed components, it should be understood that any of such components may be physically integrated and/or distributed according to the desired configuration of the computing system.

5. EXAMPLE DEVICE USER-INTERFACE

FIGS. 9A-D show aspects of an example user-interface 900. The user-interface 900 may be displayed by, for example, a wearable computing device as described above for FIGS. 5A-6B.

Figure 9A:
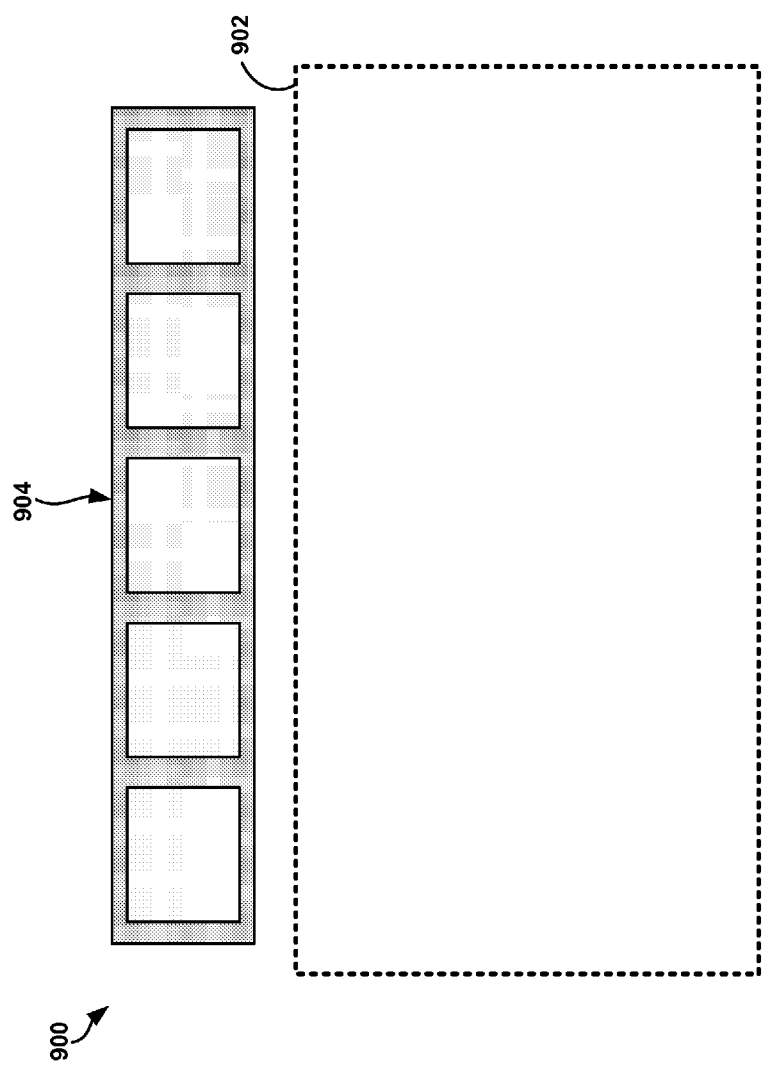
FIG. 9A shows aspects of an example user-interface.

An example state of the user-interface 900 is shown in FIG. 9A. The example state shown in FIG. 9A may correspond to a first position of the wearable computing device. That is, the user-interface 900 may be displayed as shown in FIG. 9A when the wearable computing device is in the first position. In some embodiments, the first position of the wearable computing device may correspond to a position of the wearable computing device when a wearer of the wearable computing device is looking in a direction that is generally parallel to the ground (e.g., a position that does not correspond to the wearer looking up or looking down). Other examples are possible as well.

As shown, the user-interface 900 includes a view region 902. An example boundary of the view region 902 is shown by a dotted frame. While the view region 902 is shown to have a landscape shape (in which the view region 902 is wider than it is tall), in other embodiments the view region 902 may have a portrait or square shape, or may have a non-rectangular shape, such as a circular or elliptical shape. The view region 902 may have other shapes as well.

The view region 902 may be, for example, the viewable area between (or encompassing) the upper, lower, left, and right boundaries of a display on the wearable computing device. As shown, when the wearable computing device is in the first position, the view region 902 is substantially empty (e.g., completely empty) of user-interface elements, such that the user's view of their real-world environment is generally uncluttered, and objects in the user's environment are not obscured.

In some embodiments, the view region 902 may correspond to a field of view of a wearer of the wearable computing device, and an area outside the view region 902 may correspond to an area outside the field of view of the wearer. In other embodiments, the view region 902 may correspond to a non-peripheral portion of a field of view of a wearer of the wearable computing device, and an area outside the view region 902 may correspond to a peripheral portion of the field of view of the wearer. In still other embodiments, the user-interface 900 may be larger than or substantially the same size as a field of view of a wearer of the wearable computing device, and the field of view of the wearer may be larger than or substantially the same size as the view region 902. The view region 902 may take other forms as well.

Accordingly, the portions of the user-interface 900 outside of the view region 902 may be outside of or in a peripheral portion of a field of view of a wearer of the wearable computing device. For example, as shown, a menu 904 may be outside of or in a peripheral portion of the field of view of the user in the user-interface 900. While the menu 904 is shown to be not visible in the view region 902, in some embodiments the menu 904 may be partially visible in the view region 902.

In some embodiments, the wearable computing device may be configured to receive movement data corresponding to, for example, an upward movement of the wearable computing device to a position above the first position. In these embodiments, the wearable computing device may, in response to receiving the movement data corresponding to the upward movement, cause one or both of the view region 902 and the menu 904 to move such that the menu 904 becomes more visible in the view region 902. For example, the wearable computing device may cause the view region 902 to move upward and may cause the menu 904 to move downward. The view region 902 and the menu 904 may move the same amount, or may move different amounts. In one embodiment, the menu 904 may move further than the view region 902. As another example, the wearable computing device may cause only the menu 904 to move. Other examples are possible as well.

While the term "upward" is used, it is to be understood that the upward movement may encompass any movement having any combination of moving, tilting, rotating, shifting, sliding, or other movement that results in a generally upward movement. Further, in some embodiments "upward" may refer to an upward movement in the reference frame of a wearer of the wearable computing device. Other reference frames are possible as well. In embodiments where the wearable computing device is a head-mounted device, the upward movement of the wearable computing device may also be an upward movement of a wearer's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the sensor 522 described above in connection with FIG. 5A. In some embodiments, the movement data may include a binary indication corresponding to the upward movement. In other embodiments, the movement data may include an indication corresponding to the upward movement as well as an extent of the upward movement. The movement data may take other forms as well.

FIG. 9B shows aspects of an example user-interface after receiving movement data corresponding to an upward movement. As shown, the user-interface 900 includes the view region 902 and the menu 904.

As noted above, in response to receiving the movement data corresponding to an upward movement of the wearable computing device, the wearable computing device may move one or both of the view region 902 and the menu 904 such that the menu 904 becomes more visible in the view region 902.

As shown, the menu 904 is fully visible in the view region 902. In other embodiments, however, only a portion of the menu 904 may be visible in the view region 902. In some embodiments, the extent to which the menu 904 is visible in the view region 902 may be based at least in part on an extent of the upward movement.

Thus, the view region 902 may be moved in response to receiving data corresponding to an upward movement. In some embodiments, the view region 902 may be moved in an upward scrolling or panning motion. For instance, the view region 902 may appear to a wearer of the wearable computing device as if mapped onto the inside of a static sphere centered at the wearable computing device, and movement of the view region 902 may map onto movement of the real-world environment relative to the wearable computing device. A speed, acceleration, and/or magnitude of the upward scrolling may be based at least in part on a speed, acceleration, and/or magnitude of the upward movement. In other embodiments, the view region 902 may be moved by, for example, jumping between fields of view. In still other embodiments, the view region 902 may be moved only when the upward movement exceeds a threshold speed, acceleration, and/or magnitude. In response to receiving data corresponding to an upward movement that exceeds such a threshold or thresholds, the view region 902 may pan, scroll, slide, or jump to a new field of view. The view region 902 may be moved in other manners as well.

While the foregoing description focused on upward movement, it is to be understood that the wearable computing device could be configured to receive data corresponding to other directional movement (e.g., downward, leftward, rightward, etc.) as well, and that the view region 902 may be moved in response to receiving such data in a manner similar to that described above in connection with upward movement.

As shown, the menu 904 includes a number of content objects 906. In some embodiments, the content objects 906 may be arranged in a ring (or partial ring) around and above the head of a wearer of the wearable computing device. In other embodiments, the content objects 906 may be arranged in a dome-shape above the wearer's head. The ring or dome may be centered above the wearable computing device and/or the wearer's head. In other embodiments, the content objects 906 may be arranged in other ways as well.

The number of content objects 906 in the menu 904 may be fixed or may be variable. In embodiments where the number is variable, the content objects 906 may vary in size according to the number of content objects 906 in the menu 904. In embodiments where the content objects 906 extend circularly around a wearer's head, like a ring (or partial ring), only some of the content objects 906 may be visible at a particular moment. In order to view other content objects 904, a wearer of the wearable computing device may interact with the wearable computing device to, for example, rotate the content objects 906 along a path (e.g., clockwise or counterclockwise) around the wearer's head. To this end, the wearable computing device may be configured to receive data indicating such an interaction through, for example, a touch pad, such as finger-operable touch pad 524. Alternatively or additionally, the wearable computing device may be configured to receive such data through other input devices as well.

Depending on the application of the wearable computing device, the content objects 906 may take several forms. For example, the content objects 906 may include one or more of people, contacts, groups of people and/or contacts, calendar items, lists, notifications, alarms, reminders, status updates, incoming messages, recorded media, audio recordings, video recordings, photographs, digital collages, previously-saved states, webpages, and applications, as well as tools, such as a still camera, a video camera, and an audio recorder. Content objects 906 may take other forms as well.

In embodiments where the content objects 906 include tools, the tools may be located in a particular region of the menu 904, such as the center. In some embodiments, the tools may remain in the center of the menu 904, even if the other content objects 906 rotate, as described above. Tool content objects may be located in other regions of the menu 904 as well.

The particular content objects 906 that are included in menu 904 may be fixed or variable. For example, the content objects 906 may be preselected by a wearer of the wearable computing device. In another embodiment, the content objects 906 for each content region may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some content objects 906 may fixed, while the content objects 906 may be variable. The content objects 906 may be selected in other manners as well.

Similarly, an order or configuration in which the content objects 906 are displayed may be fixed or variable. In one embodiment, the content objects 906 may be pre-ordered by a wearer of the wearable computing device. In another embodiment, the content objects 906 may be automatically ordered based on, for example, how often each content object 906 is used (on the wearable computing device only or in other contexts as well), how recently each content object 906 was used (on the wearable computing device only or in other contexts as well), an explicit or implicit importance or priority ranking of the content objects 906, and/or other criteria.

In some embodiments, the wearable computing device may be further configured to receive from the wearer a selection of a content object 906 from the menu 904. To this end, the user-interface 900 may include a cursor 908, shown in FIG. 9B as a reticle, which may be used to navigate to and select content objects 906 from the menu 904. In some embodiments, the cursor 908 may be controlled by a wearer of the wearable computing device through one or more predetermined movements. Accordingly, the wearable computing device may be further configured to receive selection data corresponding to the one or more predetermined movements.

The selection data may take several forms. For example, the selection data may be (or may be derived from) data received from one or more movement sensors, accelerometers, gyroscopes, and/or detectors configured to detect the one or more predetermined movements. The one or more movement sensors may be included in the wearable computing device, like the sensor 522, or may be included in a peripheral device communicatively coupled to the wearable computing device. As another example, the selection data may be (or may be derived from) data received from a touch pad, such as the finger-operable touch pad 524 described above in connection with FIG. 5A, or other input device included in or coupled to the wearable computing device and configured to detect one or more predetermined movements. In some embodiments, the selection data may take the form of a binary indication corresponding to the predetermined movement. In other embodiments, the selection data may indicate the extent, the direction, the velocity, and/or the acceleration associated with the predetermined movement. The selection data may take other forms as well.

The predetermined movements may take several forms. In some embodiments, the predetermined movements may be certain movements or sequence of movements of the wearable computing device or peripheral device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the wearer's head (which is assumed to move the wearable computing device in a corresponding manner). Alternatively or additionally, the predetermined movements may involve a predetermined movement of a peripheral device communicatively coupled to the wearable computing device. The peripheral device may similarly be wearable by a wearer of the wearable computing device, such that the movement of the peripheral device may follow a movement of the wearer, such as, for example, a movement of the wearer's hand. Still alternatively or additionally, one or more predetermined movements may be, for example, a movement across a finger-operable touch pad or other input device. Other predetermined movements are possible as well.

As shown, a wearer of the wearable computing device has navigated the cursor 908 to the content object 906 using one or more predetermined movements. In order to select the content object 906, the wearer may perform an additional predetermined movement, such as holding the cursor 908 over the content object 906 for a predetermined period of time. The wearer may select the content object 906 in other manners as well.

Figure 9C:
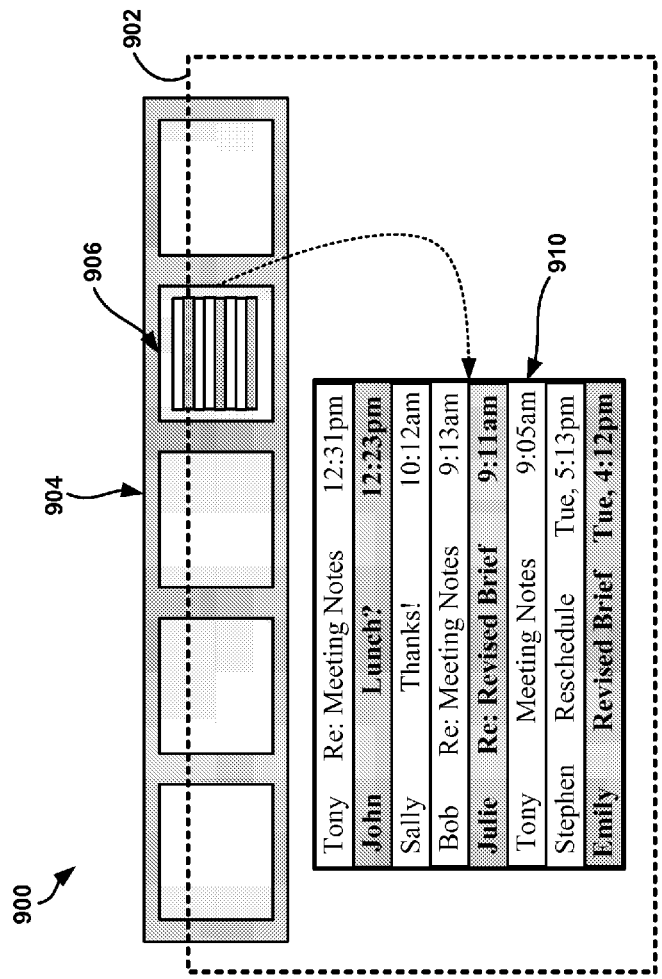
FIG. 9C shows aspects of an example user-interface after selection of a selected content object.

Once a content object 906 is selected, the wearable computing device may cause the content object 906 to be displayed in the view region 902 as a selected content object. FIG. 9C shows aspects of an example user-interface after selection of a selected content object, in accordance with an embodiment.

As indicated by the dotted arrow, the content object 906 is displayed in the view region 902 as a selected content object 910. As shown, the selected content object 910 is displayed larger and in more detail in the view region 902 than in the menu 904. In other embodiments, however, the selected content object 910 could be displayed in the view region 902 smaller than or the same size as, and in less detail than or the same detail as, the menu 904. In some embodiments, additional content (e.g., actions to be applied to, with, or based on the selected content object 910, information related to the selected content object 910, and/or modifiable options, preferences, or parameters for the selected content object 910, etc.) may be showed adjacent to or nearby the selected content object 910 in the view region 902.

Once the selected content object 910 is displayed in the view region 902, a wearer of the wearable computing device may interact with the selected content object 910. For example, as the selected content object 910 is shown as an email inbox, the wearer may wish to read one of the emails in the email inbox. Depending on the selected content object, the wearer may interact with the selected content object in other ways as well (e.g., the wearer may locate additional information related to the selected content object 910, modify, augment, and/or delete the selected content object 910, etc.). To this end, the wearable computing device may be further configured to receive input data corresponding to one or more predetermined movements indicating interactions with the user-interface 900. The input data may take any of the forms described above in connection with the selection data.

Figure 9D:
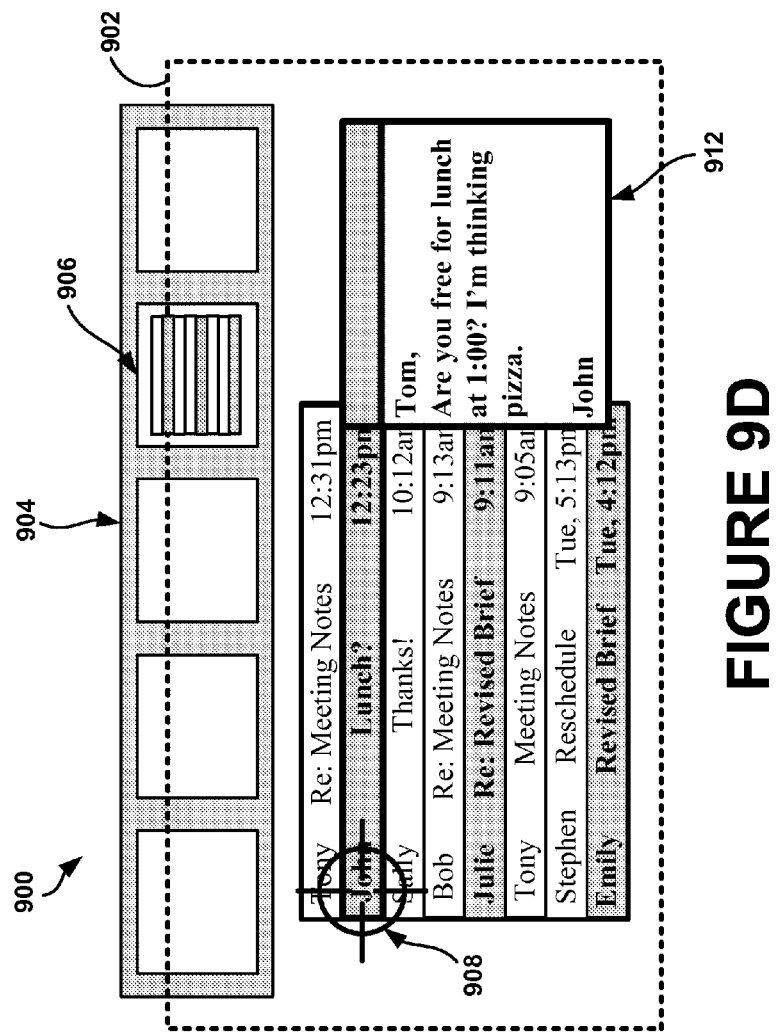
FIG. 9D shows aspects of an example user-interface after receiving input data corresponding to a user input.

FIG. 9D shows aspects of an example user-interface after receiving input data corresponding to a user input, in accordance with an embodiment. As shown, a wearer of the wearable computing device has navigated the cursor 908 to a particular subject line in the email inbox and selected the subject line. As a result, the email 912 is displayed in the view region, so that the wearer may read the email 912. The wearer may interact with the user-interface 900 in other manners as well, depending on, for example, the selected content object.

6. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

The invention claimed is:

1. A system comprising:
at least one processor;
a non-transitory computer readable medium; and
program instructions stored on the non-transitory computer readable medium and executable by the at least one processor to perform functions comprising:
maintaining a data item-attribute database comprising data for a set of data items, wherein the data for a given one of the data items specifies one or more attributes from a set of attributes;
receiving first input data indicating a first selection of one or more attributes from the set of attributes;
grouping a first subset of data items from the set of data items into at least a first data item cluster, wherein each data item in the first data item cluster shares at least one of the one or more first selected attributes;
causing a display to provide a first visual indication of the first data item cluster including one or more graphical icons representative of at least one of the one or more attributes shared by each data item in the first data item cluster;
receiving second input data indicating a second selection of one or more of the graphically represented attributes associated with one or more data items in the first data item cluster;
grouping a second subset of data items from the set of data items into at least a second data item cluster, wherein each data item in the second data item cluster shares at least one of the one or more second selected attributes; and
causing the display to provide a second visual indication of the second data item cluster.

2. The system of claim 1, wherein the display is a head-mounted display.

3. The system of claim 1, wherein causing the display to provide the first visual indication of the first data item cluster comprises:
causing the display to provide a visual indication of each data item in the first data item cluster.

4. The system of claim 3, wherein receiving second input data indicating the second selection of one or more attributes further comprises:
before receiving the second input data indicating the second selection, receiving scrolling input data indicating directional scrolling through the visual indication of the first data item cluster to a visual indication of a particular data item in the first data item cluster; and
receiving selection input data indicating a selection of one or more attributes of the particular data item in the first data item cluster.

5. The system of claim 4, wherein receiving scrolling input data indicating directional scrolling of the visual indication of the first data item cluster to the visual indication of the particular data item in the first data item cluster comprises:
detecting a physiological state corresponding to the directional scrolling.

6. The system of claim 5, wherein detecting the physiological state corresponding to the directional scrolling comprises:
detecting a direction of axial movement of the system.

7. The system of claim 5, wherein detecting the physiological state corresponding to the directional scrolling comprises receiving eye-tracking data indicating attention to a particular region of the display.

8. The system of claim 4, wherein receiving selection input data indicating a selection of the particular data item in the first data item cluster comprises:
detecting a physiological state corresponding to the selection of the particular data item in the first data item cluster.

9. The system of claim 8, wherein detecting the physiological state corresponding to the selection of the particular data item in the first data item cluster comprises receiving eye-tracking data indicating attention to a particular region of the first data item cluster.

10. The system of claim 1, wherein at least one data item in the data item-attribute table is one of a picture file, a video file, an audio file, a word-processing file, and an email file.

11. The system of claim 1, wherein the set of attributes includes at least a location attribute, time attribute, and data-item-type attribute of the given data item.

12. The system of claim 1, wherein the data for the given one of the data items further specifies one or more attribute values associated with the given data item, the one or more attribute values indicating information associated with the one or more attributes associated with the given one of the data items.

13. The system of claim 12, further comprising program instructions stored on the non-transitory computer readable medium and executable by the at least one processor to perform functions comprising:
receiving third input data indicating a selection of one or more attribute values associated with one or more data items in the second data item cluster;
grouping a third subset of the data items from the data item-attribute table into at least a third data item cluster, wherein each data item in the third data item cluster shares at least one of the one or more selected attribute values associated with one or more data items in the second data item cluster; and
causing the display to provide a third visual indication of the third data item cluster.

14. The system of claim 1, further comprising program instructions stored on the non-transitory computer readable medium and executable by the at least one processor to perform functions comprising:
receiving sensory-input data indicating a new data item; and
associating the new data item with data specifying one or more new-item attributes from the set of attributes.

15. The system of claim 14, wherein the data specifying one or more new-item attributes from the set of attributes further specifies one or more attribute values associated with the new data item, the one or more attribute values indicating a context of the sensory-input data.

16. The system of claim 1, further comprising program instructions stored on the non-transitory computer readable medium and executable by the at least one processor to perform functions comprising:
receiving third input data indicating a third selection of at least one data item from the second data item cluster; and
executing at least one computing action based on the third selection of the at least one data item from the second data item cluster.

17. A method comprising:
maintaining a data item-attribute database comprising data for a set of data items, wherein the data for a given one of the data items specifies one or more attributes from a set of attributes;
receiving first input data indicating a first selection of one or more attributes from the set of attributes;
grouping a first subset of data items from the set of data items into at least a first data item cluster, wherein each data item in the first data item cluster shares at least one of the one or more first selected attributes;

causing a display to provide a first visual indication of the first data item cluster including one or more graphical icons representative of at least one of the one or more attributes shared by each data item in the first data item cluster;

receiving second input data indicating a second selection of one or more of the graphically represented attributes associated with one or more data items in the first data item cluster;

grouping a second subset of data items from the set of data items into at least a second data item cluster, wherein each data item in the second data item cluster shares at least one of the one or more second selected attributes; and causing the display to provide a second visual indication of the second data item cluster.

18. The method of claim 17, wherein the data for a given one of the data items further specifies one or more attribute values associated with the given data item, the attribute values indicating information associated with the one or more attributes associated with the given one of the data items, further comprising:

receiving third input data indicating a selection of one or more attribute values associated with one or more data items in the second data item cluster;

grouping the data items from the data item-attribute table into at least a third data item cluster, wherein each data item in the third data item cluster shares at least one of the one or more selected attribute values associated with one or more data items in the second data item cluster; and causing the display to provide a third visual indication of the third data item cluster.

19. A non-transitory computer-readable medium having stored thereon instructions executable by a computing device to cause the computing device to perform functions comprising:

maintaining a data item-attribute database comprising data for a set of data items, wherein the data for a given one of the data items specifies one or more attributes from a set of attributes;

receiving first input data indicating a first selection of one or more attributes from the set of attributes;

grouping a first subset of data items from the set of data items into at least a first data item cluster, wherein each data item in the first data item cluster shares at least one of the one or more first selected attributes;

causing a display to provide a first visual indication of the first data item cluster including one or more graphical icons representative of at least one of the one or more attributes shared by each data item in the first data item cluster;

receiving second input data indicating a second selection of one or more of the graphically represented attributes associated with one or more data items in the first data item cluster;

grouping a second subset of data items from the set of data items into at least a second data item cluster, wherein each data item in the second data item cluster shares at least one of the one or more second selected attributes; and causing the display to provide a second visual indication of the second data item cluster.

20. The non-transitory computer readable medium of claim 19, wherein the instructions further comprise:

receiving sensory-input data indicating a new data item; and associating the new data item with data specifying one or more attributes from the set of attributes.

\* \* \* \* \*